United States Patent
Kondoh

(10) Patent No.: US 9,925,986 B2
(45) Date of Patent: Mar. 27, 2018

(54) DRIVING STATE ESTIMATION DEVICE

(71) Applicant: NISSAN MOTOR CO., LTD., Yokohama-shi, Kanagawa (JP)

(72) Inventor: Takayuki Kondoh, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/906,004

(22) PCT Filed: Jun. 5, 2014

(86) PCT No.: PCT/JP2014/002997
§ 371 (c)(1),
(2) Date: Jan. 19, 2016

(87) PCT Pub. No.: WO2015/008419
PCT Pub. Date: Jan. 22, 2015

(65) Prior Publication Data
US 2016/0152239 A1 Jun. 2, 2016

(30) Foreign Application Priority Data

Jul. 19, 2013 (JP) ................................ 2013-150725

(51) Int. Cl.
*B60W 40/08* (2012.01)
*B60W 50/06* (2006.01)
*B60W 50/00* (2006.01)

(52) U.S. Cl.
CPC ............ *B60W 40/08* (2013.01); *B60W 50/06* (2013.01); *B60W 2040/0827* (2013.01);
(Continued)

(58) Field of Classification Search
CPC .............................. B60W 40/08; B60W 50/06
See application file for complete search history.

(56) References Cited

U.S. PATENT DOCUMENTS 8,315,757 B2 11/2012 Yamamura et al.
2010/0318254 A1* 12/2010 Yamamura ............ B60W 40/12
701/31.4
2014/0358841 A1* 12/2014 Ono ..................... G08G 1/0112
706/52

FOREIGN PATENT DOCUMENTS

JP 2009-009495 A 1/2009

OTHER PUBLICATIONS

Tamhane ("Statistical Analysis of Designed Experiments: Theory and Applications").*

* cited by examiner

*Primary Examiner* — Adam R Mott
(74) *Attorney, Agent, or Firm* — Young Basile Hanlon & MacFarlane, P.C.

(57) ABSTRACT

The driving assistance unit acquires distribution data (a steering angle prediction error) for the traveling state distributions (a first traveling state distribution, a second traveling state distribution). Next the driving assistance unit converts value of the distribution data (a steering angle prediction error) into their absolute values. Next, the driving assistance unit classify the absolute value of the distribution data (a steering angle prediction error) in different time ranges into bins as plural segmented data ranges, based on the distribution data (a steering angle prediction error) whose values are converted into their absolute values and calculates a frequency distributions of the distribution data (a steering angle prediction error) as plural traveling state distributions (the first traveling state distribution, the second traveling state distribution). Next, the driving assistance unit estimates (determines driving instability degree) a driving state of a driver based on the plural calculated traveling state distributions.

8 Claims, 15 Drawing Sheets

(52) U.S. Cl.
CPC ............... *B60W 2050/0057* (2013.01); *B60W 2050/065* (2013.01); *B60W 2540/18* (2013.01)

FIG. 4

| TYPE | EVENT | DETECTING MEANS | DRIVING SITUATION |
|---|---|---|---|
| DRIVER'S OPERATION, CAUSE | LANE CHANGING, RIGHT OR LEFT TURN OF VEHICLE | BLINKER DETECTING SENSOR | SECOND DISTURBANCE DRIVING SITUATION (RESTORE PROCESSING) |
| | SHIFT TRANSMISSION | CLUTCH SENSOR, SHIFT SENSOR | SECOND DISTURBANCE DRIVING SITUATION (RESTORE PROCESSING) |
| | TUNNEL ENTRANCE | LIGHT SENSOR | SECOND DISTURBANCE DRIVING SITUATION (RESTORE PROCESSING) |
| SPRUNG BEHAVIOR | WINDING | G SENSOR (TRANSVERSE G) | SECOND DISTURBANCE DRIVING SITUATION (RESTORE PROCESSING) |
| | SKID | YAW RATE SENSOR | FIRST DISTURBANCE DRIVING SITUATION (RESET PROCESSING) |
| VEHICLE BEHAVIOR | ACTIVATION OF VDC | VDC ACTIVATION FLAG | FIRST DISTURBANCE DRIVING SITUATION (RESET PROCESSING) |
| | ACTIVATION OF LDP | LDP ACTIVATION FLAG | FIRST DISTURBANCE DRIVING SITUATION (RESET PROCESSING) |
| COMBINATION | ANY OF ABOVE EVENTS CONTINUES FOR SET TIME (LONG TIME) | | FIRST DISTURBANCE DRIVING SITUATION (RESET PROCESSING) |

| SYMBOL | NAME |
|---|---|
| $\tilde{\theta}_n$ | θn-tilde SMOOTHED STEERING ANGLE VALUE |
| $\hat{\theta}_n$ | θn-hat ESTIMATED STEERING ANGLE VALUE |

| SEGMENT bi | RANGE OF STEERING ANGLE PREDICTION ERROR $\theta e$ | PROBABILITY pi |
|---|---|---|
| b1 | $0 \sim 0.5\alpha$ | p1 |
| b2 | $0.5\alpha \sim \alpha$ | p2 |
| b3 | $\alpha \sim 2.5\alpha$ | p3 |
| b4 | $2.5\alpha \sim 5\alpha$ | p4 |
| b5 | $5\alpha \sim \infty$ | p5 |

| SEGMENT bi' | RANGE OF STEERING ANGLE PREDICTION ERROR θe | PROBABILITY pi |
|---|---|---|
| b1' | $-\infty \sim -5\alpha$ | p1 |
| b2' | $-5\alpha \sim -2\alpha$ | p2 |
| b3' | $-2\alpha \sim 2\alpha$ | p3 |
| b4' | $2\alpha \sim 5\alpha$ | p4 |
| b5' | $5\alpha \sim \infty$ | p5 |

| | b1' | b2' | b3' | b4' | b5' |
|---|---|---|---|---|---|
| FREQUENCY OF FIRST TRAVELING STATE DISTRIBUTION | p1 | p2 | p3 | p4 | p5 |
| FREQUENCY OF SECOND TRAVELING STATE DISTRIBUTION | q1 | q2 | q3 | q4 | q5 |

DRIVING STATE ESTIMATION DEVICE

CROSS REFERENCE TO RELATED APPLICATION(S)

This application claims priority to Japanese Patent Application No. 2013-150725 (filed on Jul. 19, 2013), herein incorporated by reference.

TECHNICAL FIELD

The present invention relates to a driving state estimation device.

BACKGROUND

As a conventional driving state estimation device, a technology described in JP 2009-009495 is known.

In the technology described in JP 2009-009495, a difference (hereinafter, also referred to as "distribution data") between an estimated steering angle value under assumption that a steering operation is smoothly performed and an actual steering angle is calculated based on the steering angle of a steering wheel. Next, based on the calculated distribution data, a frequency distribution (hereinafter, also referred to as "traveling state distribution") of the distribution data in a relatively long time range corresponding to an ordinary steering characteristic and a frequency distribution (the traveling state distribution) of the distribution data in a relatively short time range corresponding to a current steering characteristic are calculated.

Then, a driving state of a driver is calculated based on magnitude of a difference between the calculated two traveling state distributions. In this way, the technology described in JP 2009-009495 makes it possible to detect an unstable state of the driving with high accuracy regardless of a difference in a traffic environment. Here, in the technology described in JP 2009-009495, bins of the frequency distributions (the traveling state distribution), that is, data ranges segmented for classifying the distribution data are set in each of a positive value range and a negative value range.

SUMMARY

However, in the technology described in JP 2009-009495, the bins of traveling state distribution are set each of the positive value range and the negative value range. Thus, the number of the bins of traveling state distributions may increase. Therefore, a computing load of the driving state estimation device may increase. As a result, it is difficult to obtain the driving state estimation device using a device with a relatively low computing power, such as a smartphone, a cheap in-vehicle controller, or the like.

The present invention has been made in view of the above problem, and has an object to make it possible to reduce the computing load of the driving state estimation device.

In order to solve the above-mentioned problem, according to an aspect of the present disclosure, distribution data for traveling state distributions is acquired based on travel state data. Next, values of the acquired distribution data are converted into their absolute value. Next, based on the distribution data whose values are converted into the absolute values, the absolute values of the distribution data in different time ranges are classified into bins as plural segmented data ranges to calculate plural frequency distributions of the distribution data as the plural traveling state distributions. Next, a driving state of a driver is estimated based on the plural calculated traveling state distributions.

BRIEF DESCRIPTION OF THE DRAWINGS

FIG. 4 is a view illustrating a driving situation of the vehicle;

DETAILED DESCRIPTION OF THE EMBODIMENTS

Hereinafter, embodiments of the present invention will be described with reference to the accompanying drawings.

First Embodiment (Configuration)

Figure 1:
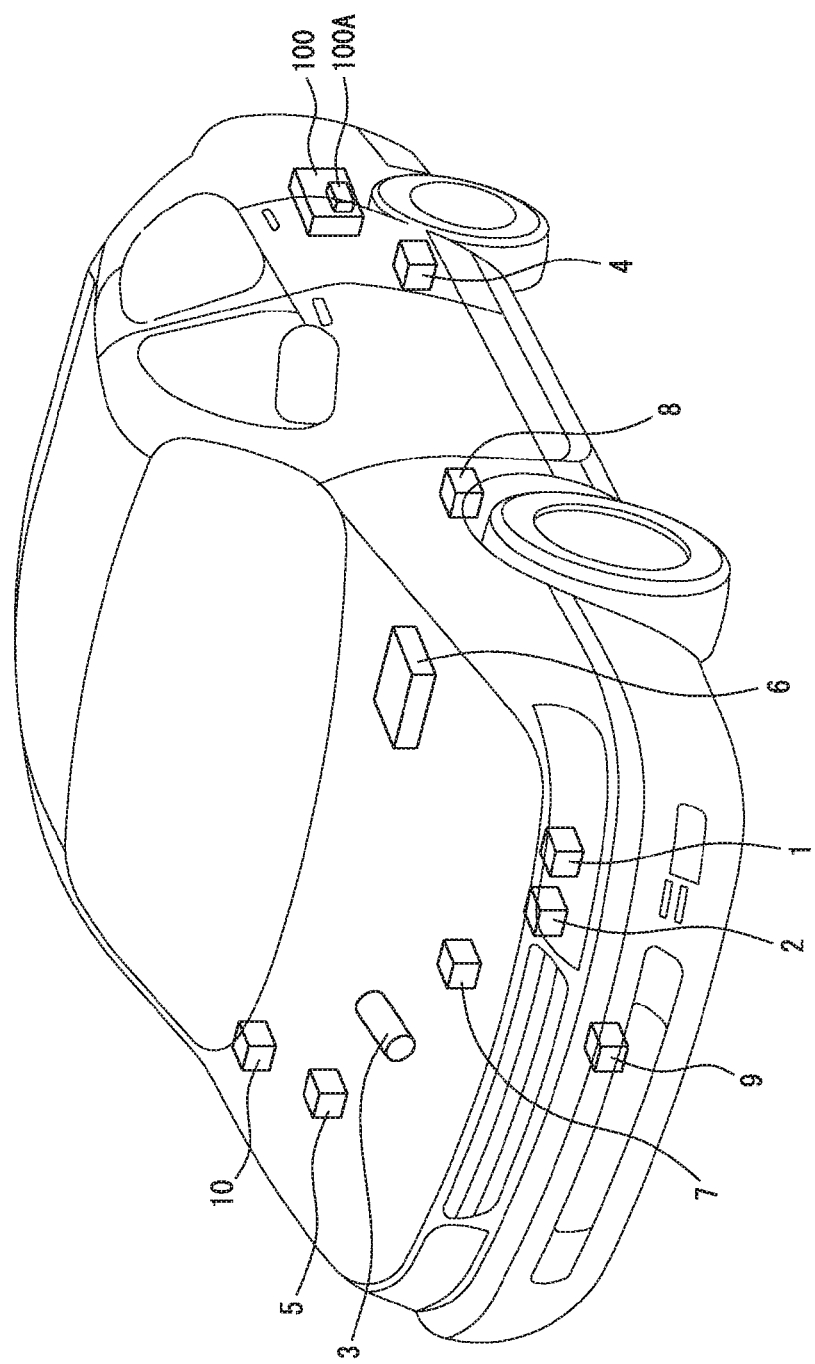
FIG. 1 is a view illustrating a configuration of a vehicle on which a driving state estimation device is mounted.

FIG. 1 is a view illustrating a configuration of a vehicle on which a driving state estimation device according to the present embodiment is mounted.

As shown in FIG. 1, a vehicle includes an accelerator pedal opening degree sensor 1, a brake pedal operation amount sensor 2, a steering angle sensor 3, a wheel speed sensor 4, a blinker detecting sensor 5, a navigation device 6. In addition, the vehicle includes a G sensor 7, a shift sensor 8, a forward vehicle detecting device 9, and a controller 100.

The accelerator pedal opening degree sensor 1 is configured to detect an opening degree of an accelerator pedal. Then, the accelerator pedal opening degree sensor 1 is configured to output the detected opening degree to the controller 100.

The brake pedal operation amount sensor 2 is configured to detect an operation amount of a brake pedal. Then, the brake pedal operation amount sensor 2 is configured to output the detected operation amount to the controller 100.

The steering angle sensor 3 is configured to detect a steering angle of a steering wheel (not illustrated). Then, the steering angle sensor 3 is configured to output the detected steering angle to the controller 100. As the steering angle sensor 3, for example, an angle sensor detecting a rotational angle of a steering column can be adapted.

The wheel speed sensor 4 is configured to detect a rotating speed (hereinafter, also referred to as "wheel speed") of a vehicle wheel. Next, the wheel speed sensor 4 is configured to calculate a vehicle speed based on the detected wheel speed. Then, the wheel speed sensor 4 is configured to output the detected wheel speed and the calculated vehicle speed to the controller 100.

The blinker detecting sensor 5 is configured to detect an operation state (hereinafter, also referred to as "blinker operation") of a blinker lever (not illustrated). The blinker operation may be detected, for example, as a presence or absence of the operation. Then, the blinker detecting sensor 5 is configured to output the detected blinker operation to the controller 100.

The shift sensor 8 is configured to detect an operation state (hereinafter, also referred to as "shift operation") of a shift lever (not illustrated). The shift operation may be detected, for example, as a position of the shift lever such as "P", "D", "R", or the like. Then, the shift sensor 8 is configured to output the detected shift operation to the controller 100.

An information presentation device is configured to present an alarm or other information to the driver in accordance with a control signal (described below) output by the controller 100. The presentation means includes a sound or an image. As the information presentation device, for example, a speaker 10 for providing information to the driver as a buzzer sound or the sound and a display unit for providing information to the driver by displaying the image or a text may be adapted. The display monitor of the navigation device 6, for example, can be used as the display unit.

The navigation device 6 includes a GPS (Global Positioning System) receiver, a map database, and the display monitor. Then, the navigation device 6 is configured to acquire the current position of the vehicle and road information from the GPS receiver and the map database. Next, the navigation device 6 is configured to acquire a variety of information such as a type of a road on which the vehicle travels or a width of the road, based on the acquired current position of the vehicle and the acquired road information. Next, the navigation device 6 is configured to display a result of a route search, a result of a route guidance, or the like on the display monitor, based on the acquired information.

The G sensor 7 is configured to detect a longitudinal acceleration or a transverse acceleration generated on the vehicle. Then, the G sensor 7 is configured to output the detected longitudinal acceleration and the detected transverse acceleration to the controller 100.

The forward vehicle detecting device 9 is configured to detect information on another vehicle and another object (for example, a distance to the object) present in front of the vehicle in the traveling direction thereof. Then, the forward vehicle detecting device 9 is configured to output the detected information to the controller 100. As the forward vehicle detecting device 9, for example, a laser distance meter that radiates a laser light forward in the traveling direction of the vehicle and detects a reflected light thereof can be adapted.

The controller 100 includes a CPU (Central Processing Unit) and CPU peripheral components such as ROM (Read Only Memory), RAM (Random Access Memory), an A/D conversion circuit, and the like. Then, the controller 100 includes a driving assistance unit 100A that performs a driving instability degree determination processing. In the driving instability degree determination processing, the driving assistance unit 100A acquires a traveling state data including at least one of an operation state of a driving operator operable by the driver and a vehicle state, based on the detection results output from the accelerator pedal opening degree sensor 1 and the brake pedal operation amount sensor 2. The driving operator may include, for example, the steering wheel, the accelerator pedal, and the brake pedal. The vehicle state may include inter-vehicular information with respect to a forward vehicle. In the present embodiment, information on the steering angle (hereinafter, also referred to as "steering angle information") output from the steering angle sensor 3 is adapted as the traveling state data.

Next, the driving assistance unit 100A acquires a distribution data (a steering angle prediction error $\theta e$ (described below)) for plural traveling state distributions (a first traveling state distribution, a second traveling state distribution (described below)) based on the acquired traveling state data (the steering angle information). An acquisition period of the distribution data (the steering angle prediction error $\theta e$) is set to a predetermined first period (for example, 50 msec). Next, the driving assistance unit 100A calculates plural frequency distributions of absolute values of the distribution data (the steering angle prediction error $\theta e$) in different time ranges based on the acquired distribution data (the steering angle prediction error $\theta e$), as the plural traveling state distributions (the first traveling state distribution, the second traveling state distribution). The calculation period of the traveling state distributions (the first traveling state distribution, the second traveling state distribution) is set to a second period (for example, 5 seconds) longer than the first period (for example, 50 msec). Next, the driving assistance unit 100A calculates absolute entropies Hp1 and Hp2 (described below) based on the plural calculated traveling state distributions (the first traveling state distribution, the second traveling state distribution).

Next, the driving assistance unit 100A determines a driving state (a driving instability degree (described below)) of the driver based on the calculated absolute entropies Hp1 and Hp2. Next, the driving assistance unit 100A determines the driving state (the driving instability degree) of the driver based on magnitude of a difference (a relative entropy RHp (described below)) between the plural calculated traveling state distributions (the first traveling state distribution, the second traveling state distribution). Then, the driving assistance unit 100A outputs a control signal to the information presentation device based on the determined driving state (the driving instability degree). The control signal makes the information present device present the alarm or other information (hereinafter, also referred to as "presentation information") to driver. In this way, the driving assistance unit 100A presents the presentation information to the driver to invite driver's attention to the driving instability degree (an unstable state of driving).

It is to be noted that, as the traveling state data, the inter-vehicular information (an inter-vehicular distance or an inter-vehicular time) with respect to a forward vehicle, an acceleration/deceleration information based on the operation of the accelerator pedal and the brake pedal, or the like can be adapted. When the inter-vehicular information (the inter-vehicular distance or the inter-vehicular time) or the acceleration/deceleration information is adapted, the traveling state distributions (the first traveling state distribution, the second traveling state distribution) and the magnitude (the relative entropy RHp) of the difference therebetween can be calculated by a known way as described in the International Publication Pamphlet No. WO2009/013815 (Japanese Patent application No. 2009-524342) or the like.

As the controller 100, for example, a smartphone, an in-vehicle controller, and a cloud server can be adapted. When the cloud server is adapted, the vehicle transmits the detection results output from the accelerator pedal opening degree sensor 1, the brake pedal operation amount sensor 2 and the like to the cloud server. Then, the cloud server performs the driving instability degree determination processing based on the detection results transmitted from the vehicle. Based on the result of the driving instability degree determination processing, the cloud server transmits the control signal to the information presentation device for making the information presentation device present the presentation information to the driver. Then, the vehicle presents the presentation information to the driver by using the information presentation device based on the control signal transmitted from the cloud server.

Figure 2:
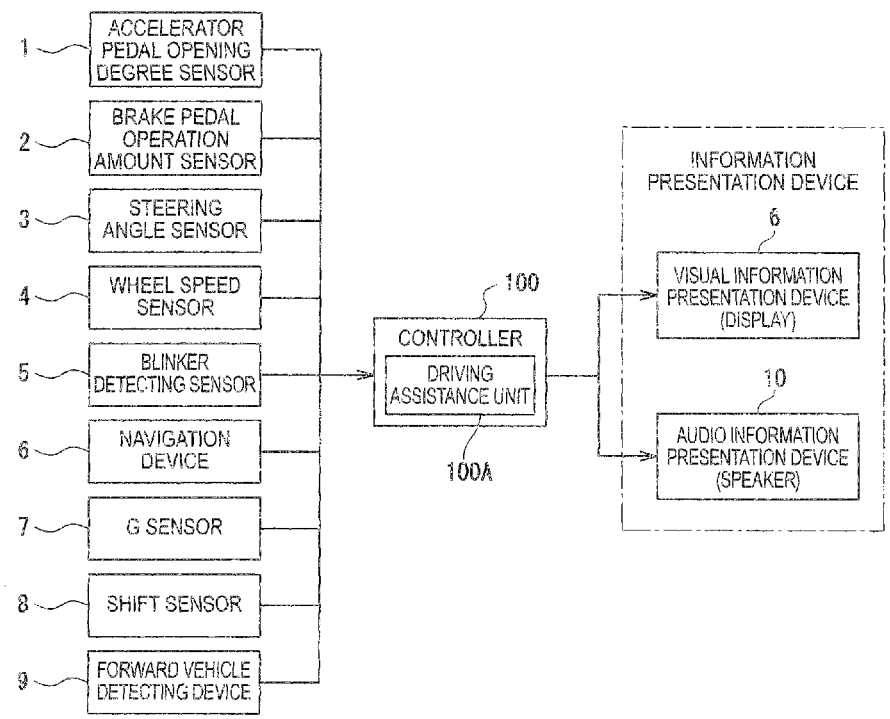
FIG. 2 is a block diagram illustrating an example of a system configuration of the driving state estimation device.

FIG. 2 is a block diagram illustrating an example of a system configuration of the driving state estimation device of the present embodiment.

As illustrated in FIG. 2, examples of the information presentation device in the present embodiment are a visual information presentation device and an audio information presentation device. Furthermore, an example of the visual information presentation device is the display monitor, and an example of the audio information presentation device is a speaker 10.

Figure 3:
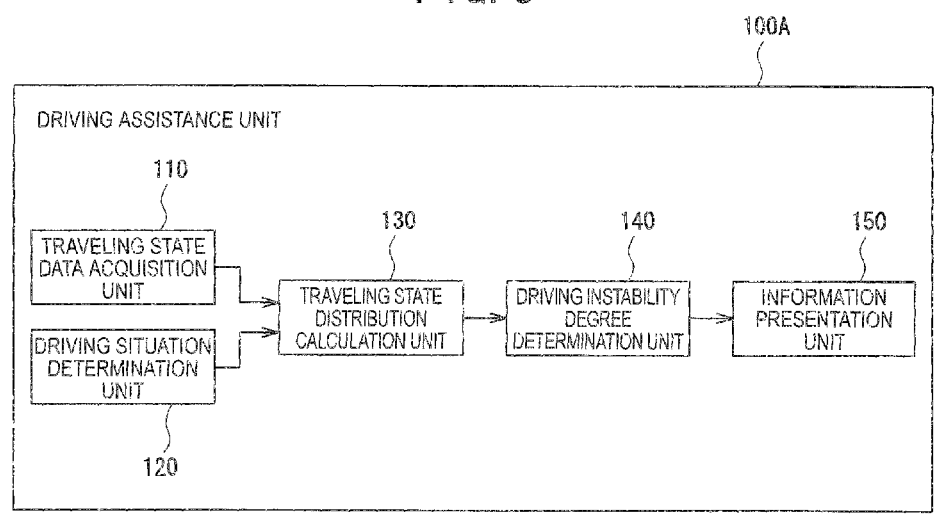
FIG. 3 is a block diagram illustrating a configuration of a driving assistance unit 100A.

FIG. 3 is a block diagram illustrating a configuration of the driving assistance unit 100A of the present embodiment.

As illustrated in FIG. 3, the driving assistance unit 100A includes a traveling state data acquisition unit 110, a driving situation determination unit 120, a traveling state distribution calculation unit 130, a driving instability degree determination unit 140, and an information presentation unit 150.

The traveling state data acquisition unit 110 is configured to acquire the detection result output from the steering angle sensor 3. Then, the controller 100 is configured to take the acquired detection result as the traveling state data.

FIG. 4 is a view illustrating a driving situation of the vehicle.

The driving situation determination unit 120 is configured to determine the driving situation of the vehicle (a first disturbance driving situation (described below), a second disturbance driving situation (described below), or an ordinary driving situation (described below)), based on the detection results output from the accelerator pedal opening degree sensor 1, the brake pedal operation amount sensor 2, and the like. Specifically, the driving situation determination unit 120 is configured to detect the operation state of the driving operator operable by the driver, a traveling environment, and the vehicle state based on the detection results output from the accelerator pedal opening degree sensor 1, the brake pedal operation amount sensor 2, and the like. Next, based on the detected operation state of the driving operator, the detected traveling environment, and the detected vehicle state, the driving situation determination unit 120 is configured to determine whether or not the driving situation of the vehicle is the first disturbance driving situation (a driving situation to be a disturbance to estimation of the driving state). The first disturbance driving situation is, for example, a driving situation occurs in an event such as a skid, activation of VDC (Vehicle Dynamics Control), activation of LDP (Lane Departure Preservation), and a continuation for a predetermined period of time of any of various events (lane changing, a right or left turn of the vehicle, acceleration or deceleration of the vehicle, an operation of the brake pedal (not illustrated), a shift transmission operation, a switch lever operation, a tunnel entrance, winding, and a joint on the road face), or the like. The activation of VDC is detected, for example, based on a VDC activation flag indicative of the activation of VDC. The activation of LDP is detected, for example, based on an LDP activation flag indicative of the activation of LDP.

In addition, based on the detected operation state of the driving operator, the detected traveling environment, and the detected vehicle state, the detected the driving situation determination unit 120 is configured to determine whether or not the driving situation of the vehicle is the second disturbance driving situation (a driving situation to be a disturbance to estimation of the driving state). The second disturbance driving situation is, for example, a driving situation occurs in an event such as the lane changing, the right or left turn of the vehicle, the shift transmission operation, the tunnel entrance, the winding, or the like. The lane changing and the right or left turn of the vehicle is detected, for example, based on the blinker detecting sensor 5. The shift transmission operation is detected, for example, based on a clutch sensor (not illustrated) detecting an operation state of a clutch, or the shift sensor 8. The tunnel entrance is detected, for example, based on a light sensor (not illustrated) detecting an operating state of a headlight (not illustrated). The winding is detected, for example, based on the G sensor 7 (a transverse G). On the other hand, when the driving situation determination unit 120 is configured to determine that the driving situation of the vehicle is a driving state (herein, also referred to as "ordinary driving situation") not to be a disturbance to determination of the driving instability degree, when it is determined that the driving situation of the vehicle is not either of the first disturbance driving situation or the second disturbance driving situation.

The traveling state distribution calculation unit 130 is configured to acquire the distribution data (the steering angle prediction error θe) for the traveling state distributions (first traveling state distribution, second traveling state distribution) based on the traveling state data (the steering angle information) that the traveling state data acquisition unit 110 has acquired. The acquisition period of the steering angle prediction error θe is set to the first period (for example, 50 msec). Next, the traveling state distribution calculation unit 130 is configured to calculate plural frequency distributions of the absolute values of the distribution data (the steering angle prediction error θe) in different time ranges based on the acquired distribution data (the steering angle prediction error θe), as the plural traveling state distributions (the first traveling state distribution, the second traveling state distribution). The calculation period of the traveling state distributions (the first traveling state distribution, the second traveling state distribution) is set to the second period (for example, 5 seconds) longer than the first period (for example, 50 msec).

Specifically, the traveling state distribution calculation unit 130 is configured to calculate the frequency distribution of the absolute values of the distribution data (the steering angle prediction error θe) acquired in a predetermined relatively long time range (for example, 2160 seconds), as the first traveling state distribution, based on the acquired distribution data (the steering angle prediction error θe). Furthermore, the traveling state distribution calculation unit 130 is configured to calculate the frequency distribution of the absolute values of the distribution data (the steering angle prediction error θe) acquired in a time range (for example, 90 seconds) shorter than the first traveling state distribution (for example, 2160 seconds), as the second traveling state distribution, based on the acquired distribution data (the steering angle prediction error θe). An example of calculation of the first traveling state distribution and the second traveling state distribution will be described below.

Figure 5:
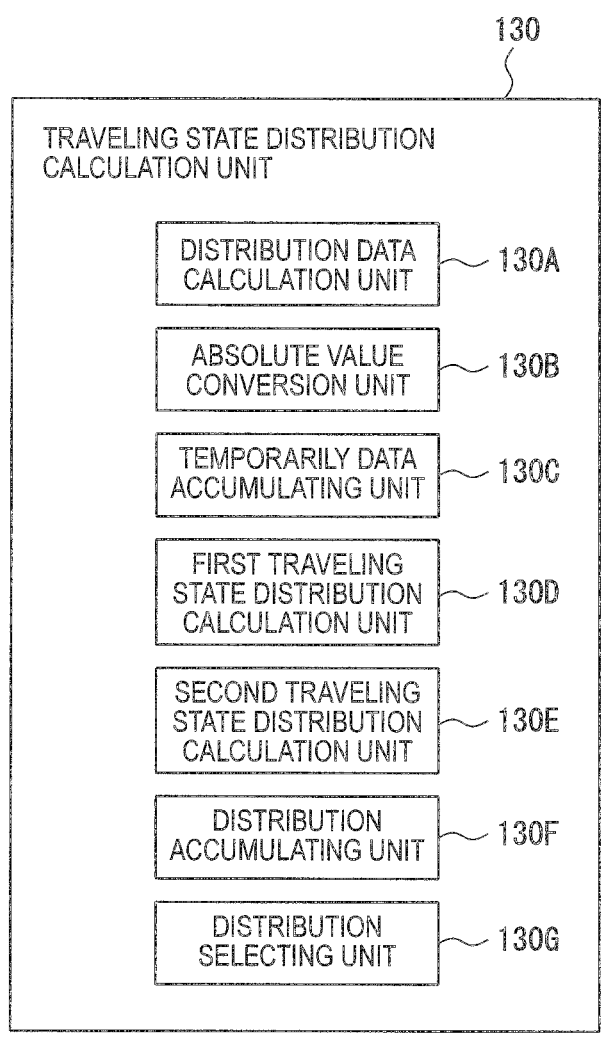
FIG. 5 is a block diagram illustrating a configuration of a traveling state distribution calculation unit 130.

FIG. 5 is a block diagram illustrating a configuration of the traveling state distribution calculation unit 130 of the present embodiment.

As illustrated in FIG. 5, the traveling state distribution calculation unit 130 includes a distribution data calculation unit 130A, an absolute value conversion unit 130B, a temporarily data accumulating unit 130C, a first traveling state distribution calculation unit 130D, a second traveling state distribution calculation unit 130E, a distribution accumulating unit 130F, and a distribution selecting unit 130G.

The distribution data calculation unit 130A is configured to calculate the distribution data (the steering angle prediction error θe) based on the traveling state data (the steering angle information (the steering angle θ)) that the traveling state data acquisition unit 110 has acquired. The steering angle prediction error θe is calculated by every predetermined first period (for example, 50 msec).

The absolute value conversion unit 130B is configured to acquire the distribution data (the steering angle prediction error θe) calculated by the distribution data calculation unit 130A. Then, the absolute value conversion unit 130B is configured to convert values of the acquired distribution data (the steering angle prediction error θe) into their absolute values.

The temporarily data accumulating unit 130C is configured to accumulate the distribution data (the steering angle prediction error θe) whose values are converted into the absolute values by the absolute value conversion unit 130B. The distribution data (the steering angle prediction error θe) whose value is converted into the absolute value is accumulated in the temporarily data accumulating unit 130C by every the first period (for example, 50 msec).

The first traveling state distribution calculation unit 130D is configured to calculate the frequency distribution of the absolute values of the distribution data (the steering angle prediction error θe) as the first traveling state distribution, based on the distribution data (the steering angle prediction error θe) accumulated in the temporarily data accumulating unit 130C, whose values are converted into the absolute values. The first traveling state distribution is calculated by ever second period (for example, 5 seconds) larger than the first period (50 msec).

The second traveling state distribution calculation unit 130E is configured to calculate the frequency distribution of the absolute values of the distribution data (the steering angle prediction error θe) as the second traveling state distribution, based on the distribution data (the steering angle prediction error θe) accumulated in the temporarily data accumulating unit 130C, whose values are converted into the absolute values. The second traveling state distribution is calculated by ever second period (for example, 5 seconds) larger than the first period (50 msec).

The distribution accumulating unit 130F is configured to acquire the second traveling state distribution calculated by the second traveling state distribution calculation unit 130E. The distribution accumulating unit 130F is configured to accumulate the acquired second traveling state distribution therein.

When the driving situation determination unit 120 determines that the driving situation of the vehicle is the driving situation (the first disturbance driving situation, the second disturbance driving situation) to be a disturbance to the estimation of the driving state (i.e. the determination of the driving instability degree), the distribution selecting unit 130G changes the traveling state distributions (the first traveling state distribution, the second traveling state distribution) calculated by the first traveling state distribution calculation unit 130D and the second traveling state distribution calculation unit 130E. Specifically, the distribution selecting unit 130G is configured to determine based on the determination result by the driving situation determination unit 120, which of the first disturbance driving situation and the second disturbance driving situation the driving situation of the vehicle falls under. When it is determined that the driving situation of the vehicle falls under the first disturbance driving situation, the distribution selecting unit 130G replaces the second traveling state distribution calculated by the second traveling state distribution calculation unit 130E with the first traveling state distribution calculated by the first traveling state distribution calculation unit 130D (hereinafter, also referred to as "reset processing").

On the other hand, when it is determined that the driving situation of the vehicle falls under the second disturbance driving situation, the distribution selecting unit 130G replaces the second traveling state distribution calculated by the second traveling state distribution calculation unit 130E with the second traveling state distribution that does not include the absolute values of the distribution data (the steering angle prediction error θe) during a period in which it is determined that the driving situation of the vehicle is any of the first disturbance driving situation and the second disturbance driving situation (hereinafter, also referred to as "restore processing").

The driving instability degree determination unit 140 is configured to the estimate the driving state (i.e. the driving instability degree) of the driver based on the first traveling state distribution and the second traveling state distribution (the replaced second traveling state distribution in a case in which the second traveling state distribution has been replaced) calculated by the traveling state distribution calculation unit 130.

The information presentation unit 150 is configured to perform a processing (hereinafter, also referred to as "information presentation processing") of presenting the presentation information to the driver based on the driving state (i.e. the driving instability degree) of the driver estimated by the driving instability degree determination unit 140. In the information presentation processing, the information presentation unit 150 outputs the presentation information (i.e. the control signal making the information presentation device present the alarm or other information to be presented to the driver) to the information presentation device.

(Driving Instability Degree Determination Processing)

Next, the driving instability degree determination processing performed by the driving assistance unit 100A will be described below. The driving instability degree determination processing is performed by every predetermined control period.

Figure 6:
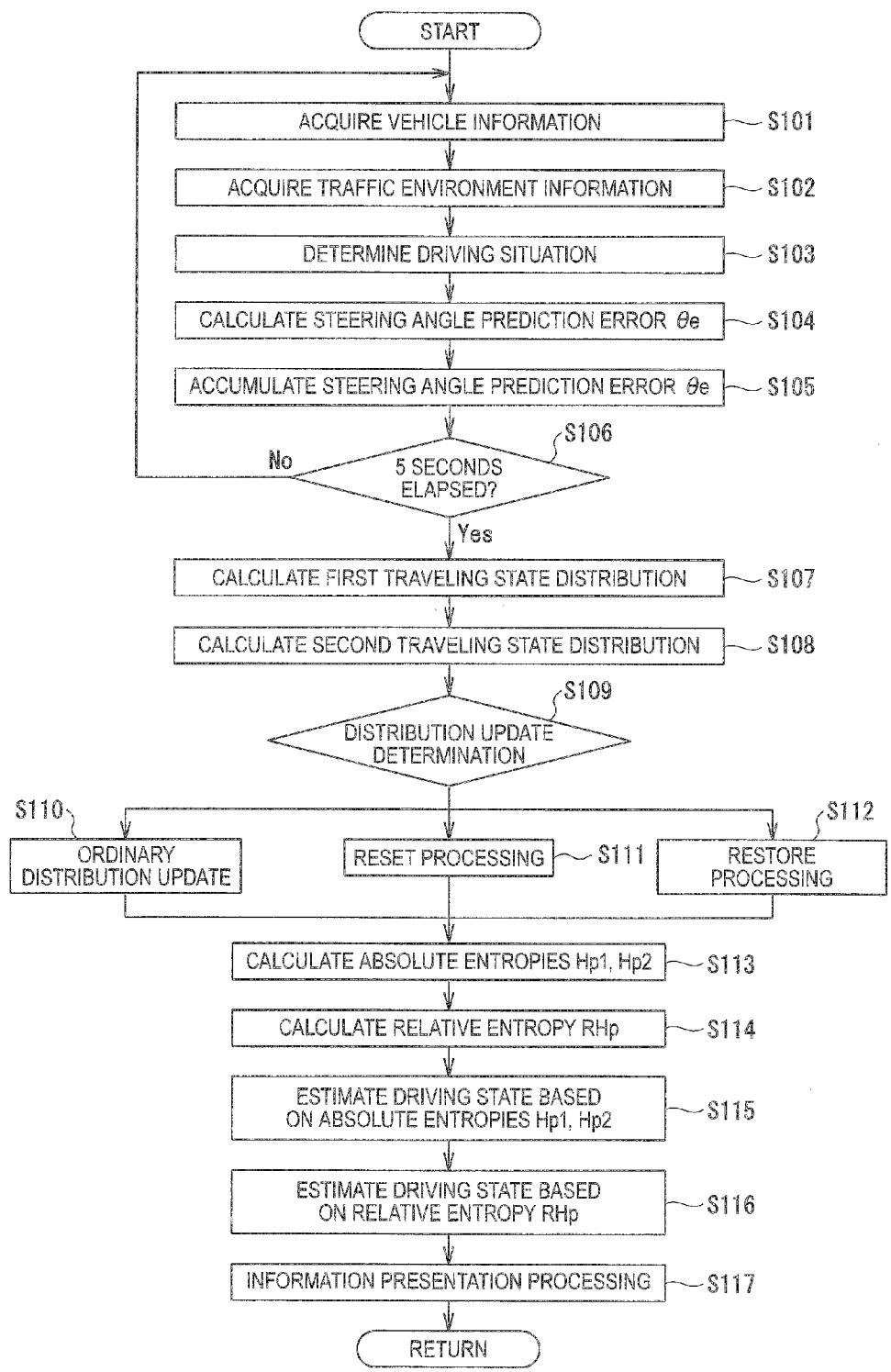
FIG. 6 is a flowchart illustrating a driving instability degree determination processing.

FIG. 6 is a flowchart illustrating the driving instability degree determination processing.

As illustrated in FIG. 6, first, in step S101, the driving assistance unit 100A (the traveling state data acquisition unit 110, the driving situation determination unit 120) acquires vehicle information. The vehicle information is, for example, the traveling state data (the steering angle information) or the operation state of the driving operator.

Next, in step S102, the driving assistance unit 100A (the driving situation determination unit 120) acquires traffic environment information. The traffic environment information is, for example, information on the traveling environment.

Next, in step S103, the driving assistance unit 100A (the driving situation determination unit 120) determines the driving situation of the vehicle (the first disturbance driving situation, the second disturbance driving situation, the ordinary driving situation) based on the vehicle information acquired in step S101 and the traffic environment information acquired in step S102. Specifically, the driving assistance unit 100A (the driving situation determination unit 120) detects the operation state of the driving operator, the traveling environment, or the vehicle state based on the vehicle information acquired in step S101 and the traffic environment information acquired in step S102. Next, the driving assistance unit 100A (the driving situation determination unit 120) determines which of the first disturbance driving situation, the second disturbance driving situation, and the ordinary driving situation the driving situation of the vehicle falls under, based on the detected operation state of the driving operator, the detected traveling environment, or the detected vehicle state.

Figures 7, 8:
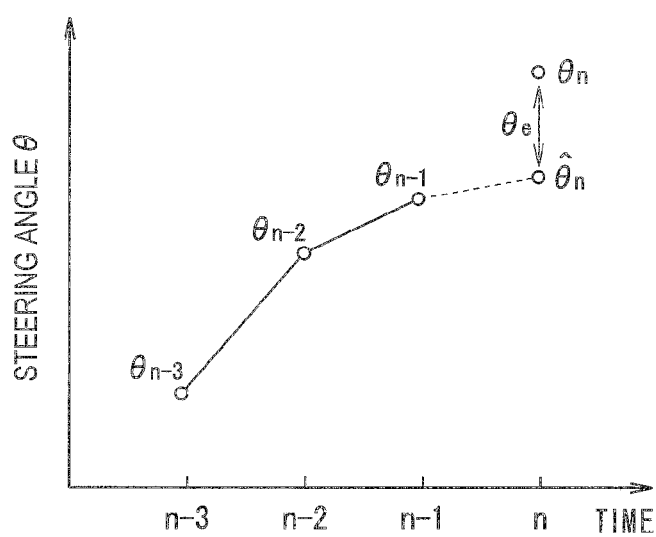
FIG. 7 is a view illustrating symbols used for calculating absolute entropies Hp1, Hp2, and a relative entropy RHp.
FIG. 8 is a view illustrating a steering angle prediction error θe.

Next, in step S104, the traveling state distribution calculation unit 130 (the distribution data calculation unit 130A) calculates the steering angle prediction error θe based on the traveling state data (the steering angle information) acquired in step S101. Here, FIG. 7 illustrates special symbols used for calculating absolute entropies Hp1, Hp2, and a relative entropy RHp and names of these special symbols. A smoothed steering angle value θn-tilde is a steering angle θ from which the influence of quantization noise is reduced. In addition, an estimated steering angle value θn-hat is a value acquired by estimating the steering angle θ at the time of sampling under assumption that the steering wheel is operated smoothly. The estimated steering angle value θn-hat is acquired by performing a second-order Taylor expansion process on the smoothed steering angle value θn-tilde, as expressed by Expression 1.

$$\hat{\theta}_n = \tilde{\theta}_{n-1} + (t_n - t_{n-1})\left(\frac{\tilde{\theta}_{n-1} - \tilde{\theta}_{n-2}}{t_{n-1} - t_{n-2}}\right) + \frac{(t_n - t_{n-1})}{2}\left(\frac{\tilde{\theta}_{n-1} - \tilde{\theta}_{n-2}}{t_{n-1} - t_{n-2}} - \frac{\tilde{\theta}_{n-2} - \tilde{\theta}_{n-3}}{t_{n-2} - t_{n-3}}\right)$$

(Expression 1)

In Expression 1, tn represents the sampling time of the steering angle θn. The smoothed steering angle value θn-tilde is calculated as an average value of three neighboring steering angles θn in accordance with following expression 2 so as to reduce the influence of quantization noise.

$$\tilde{\theta}_{n-k} = \frac{1}{3}\sum_{i=-1}^{1} \theta_{n-kl+1}$$

(Expression 2)

In Expression 2, l represents the number of samples of the steering angles θn included in 150 msec when the calculation time interval of the smoothed steering angle value θn-tilde is set to 150 msec, i.e., the minimum time interval which a human being can intermittently manipulate in a manual operation.

When the sampling interval of the steering angle θn is defined as Ts, the number of samples l is expressed by following Expression 3.

$$l = \text{round}(0.15/Ts)$$

(Expression 3)

In Expression 3, the smoothed value θn-tilde can be calculated based on three steering angles θn as sum of the steering angles at 150 msec intervals and neighboring steering angles adjacent thereto, by taking values when k=1, 2, and 3 and using (k*l). Therefore, the estimated value θn-hat calculated on the basis of the smoothed value θn-tilde is substantially calculated based on the steering angle θ obtained at the intervals of 150 msec.

FIG. 8 is a view illustrating the steering angle prediction error θe.

As illustrated in FIG. 8, the steering angle prediction error θe at the time of sampling can be calculated by following Expression 4 as a difference between the estimated steering angle value θn-hat at the time of sampling when it is assumed that the steering wheel is operated smoothly and an actual steering angle value θn.

$$\theta_e = \theta_n - \hat{\theta}_n$$

(Expression 4)

However, the steering angle prediction error θe is calculated for the steering angle θn every the minimum time interval, i.e., 150 msec, which a human being can intermittently manipulate in a manual operation.

A specific method of calculating the steering angle prediction error θe will be described below. It is to be noted that the sampling interval Ts of the steering angle signal θ is set to, for example, 50 msec. First, three smoothed steering angle values θn-tilde are calculated in accordance with Expression 2 using three neighboring steering angles θn at 150 msec intervals. The three smoothed steering angle values θn-tilde are expressed by Expression 5.

$$\tilde{\theta}_{n-1} = \tfrac{1}{3}(\theta_{n-4} + \theta_{n-3} + \theta_{n-2}),$$

$$\tilde{\theta}_{n-2} = \tfrac{1}{3}(\theta_{n-7} + \theta_{n-6} + \theta_{n-5}),$$

$$\tilde{\theta}_{n-3} = \tfrac{1}{3}(\theta_{n-10} + \theta_{n-9} + \theta_{n-8}),$$

(Expression 5)

Next, the estimated steering angle value θn-hat is calculated in accordance with Expression 1 using the three calculated smoothed steering angle values θn-tilde. The estimated values θn-hat is expressed by Expression 6.

$$\hat{\theta}_n = \tilde{\theta}_{n-1} + Ts \cdot \frac{\tilde{\theta}_{n-1} - \tilde{\theta}_{n-2}}{Ts} + \frac{Ts}{2}\left(\frac{\tilde{\theta}_{n-1} - \tilde{\theta}_{n-2}}{Ts} - \frac{\tilde{\theta}_{n-2} - \tilde{\theta}_{n-3}}{Ts}\right)$$

$$= \tilde{\theta}_{n-1} + (\tilde{\theta}_{n-1} - \tilde{\theta}_{n-2}) +$$

(Expression 6)

-continued $$\frac{1}{2}\{(\tilde{\theta}_{n-1} - \tilde{\theta}_{n-2}) - (\tilde{\theta}_{n-2} - \tilde{\theta}_{n-3})\}$$

Then, the steering angle error θe is calculated in accordance with Expression 4 using the calculated estimated steering angle value θn-hat and the actual steering angle θn.

Next, in step S105, the driving assistance unit 100A (the absolute value conversion unit 130B) converts the steering angle prediction error θe (the distribution data) calculated in step S104 into its absolute value. Next, the driving assistance unit 100A (the temporarily data accumulating unit 130C) accumulates the distribution data (the steering angle prediction error θe) whose value is converted into the absolute value, in the temporarily data accumulating unit 130C.

Next, in step S106, the driving assistance unit 100A (the temporarily data accumulating unit 130C, the first traveling state distribution calculation unit 130D, the second traveling state distribution calculation unit 130E) determines whether or not a predetermined set time (for example, 5 seconds) elapses from the start of the driving instability degree determination processing. Specifically, the driving assistance unit 100A (the temporarily data accumulating unit 130C, the first traveling state distribution calculation unit 130D, the second traveling state distribution calculation unit 130E) determines whether or not a timer value T of a timer (not illustrated) that counts an elapsed time from the start of driving instability degree determination processing is equal to or longer than the set time (for example, 5 seconds). Then, when the driving assistance unit 100A (the temporarily data accumulating unit 130C, the first traveling state distribution calculation unit 130D, the second traveling state distribution calculation unit 130E) determines that the timer value T is equal to or longer than the set time (for example, 5 seconds) (Yes), the process proceeds to step S107.

On the other hand, when the driving assistance unit 100A (the temporarily data accumulating unit 130C, the first traveling state distribution calculation unit 130D, the second traveling state distribution calculation unit 130E) determines that the timer value T is shorter than the set time (for example, 5 seconds) (No), the process proceeds to step S101. In this way, the driving assistance unit 100A repeatedly performs the flow of steps S101 to S106 until the set time (for example, 5 seconds) elapses from the start of the driving instability degree determination processing. That is, the driving assistance unit 100A does not perform a flow in and after step S107 until the set time (for example, 5 seconds) elapses from the start of the driving instability degree determination processing. Therefore, the driving assistance unit 100A performs the steps S107 to S117 described below, that is, calculation of the first traveling state distribution and the second traveling state distribution by every the second period (for example, 5 seconds).

Here, in the present embodiment, the driving assistance unit 100A performs the flow of steps S101 to S106 by every the predetermined first period (for example, 50 msec).

Figure 9:
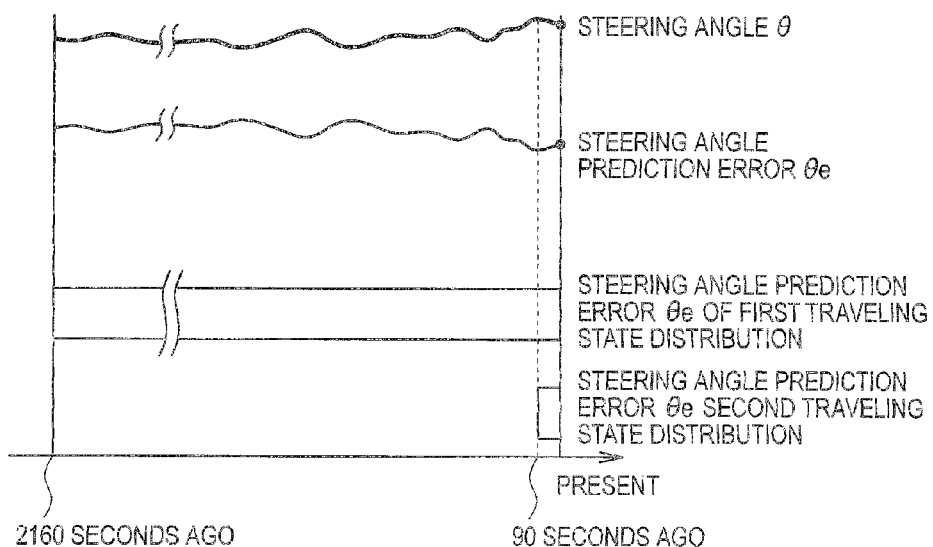
FIG. 9 is a view illustrating method for calculating a first traveling state distribution and a second traveling state distribution.
Figure 10:
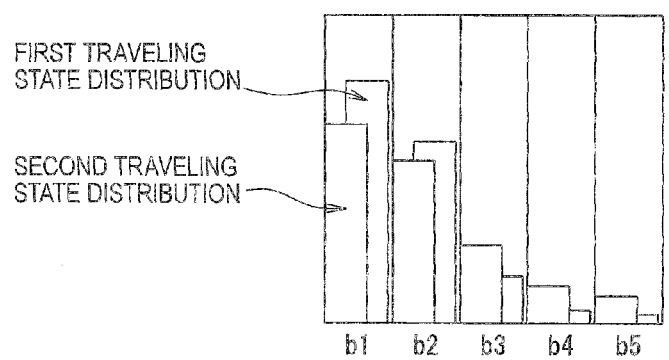
FIG. 10 is a view illustrating method for calculating the first traveling state distribution and the second traveling state distribution.
Figures 11, 12:
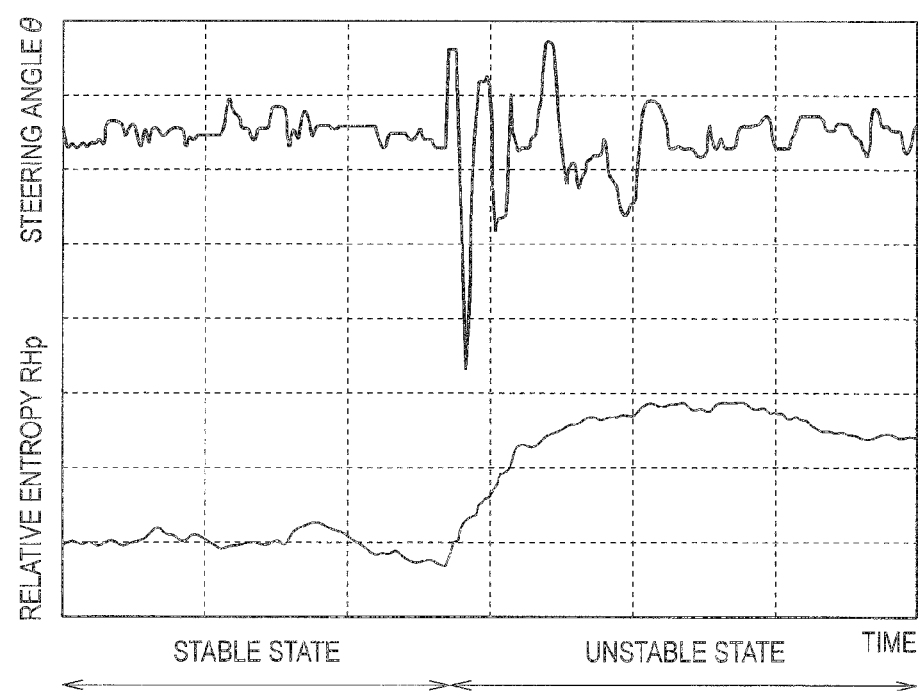
FIG. 11 is a view illustrating a range of a prediction error segment bi.
FIG. 12 is a view illustrating the relative entropy RHp.

FIG. 9 and FIG. 10 are a view illustrating method for calculating the first traveling state distribution and the second traveling state distribution. FIG. 11 is a view illustrating a range of a prediction error segment bi.

In step S107, the driving assistance unit 100A (the first traveling state distribution calculation unit 130D) calculates the frequency distribution of the absolute values of the distribution data (the steering angle prediction error θe) as the first traveling state distribution, based on the distribution data (the steering angle prediction error θe) accumulated in the temporarily data accumulating unit 130C, whose values are converted into the absolute values. Specifically, as illustrated in FIG. 9, FIG. 10, and FIG. 11, the driving assistance unit 100A (the first traveling state distribution calculation unit 130D) classifies the absolute values of the steering angle prediction errors θe for the set time T0 seconds (for example, 2160 seconds) from the set time T0 seconds ago to the present out of the absolute values of the steering angle prediction errors θe accumulated in the temporarily data accumulating unit 130C into plural segmented data ranges (hereinafter, also referred to as "bin"). In the present embodiment, five prediction error segments bi (=b1, b2, b3, b4, and b5) are adapted as the bins.

The ranges of the prediction error segments bi (=b1 to b5) are set based on a value used for calculation of a steering entropy. The α value is, for example, calculated as a 90 percentile (a range of distribution including 90% of the steering angle prediction errors θe) by calculating the steering angle prediction errors θe (i.e. the difference between the estimated steering angle value θn-hat under assumption that the steering wheel is smoothly operated and the actual steering angle θn) within a constant time based on time-series data of the steering angle θ and, measuring a distribution (deviation) of the steering angle prediction errors θe. That is, the α value is set such that the 90% of the steering angle prediction errors θe is included within a section [−α, α]

Specifically, the prediction error segment b1 is equal to or larger than zero and smaller than 0.5α, the prediction error segment b2 is equal to or larger than 0.5α and smaller than α, the prediction error segment b3 is equal to or larger then α and smaller than 2.5α, the prediction error segment b4 is equal to or larger than 2.5α and smaller than 5α, and the prediction error segment b5 is equal to or larger than 5α. The same ranges of the prediction error segments bi (=b1 to b5) are used for the first traveling state distribution and the second traveling state distribution. Next, the driving assistance unit 100A (the first traveling state distribution calculation unit 130D) calculates probabilities pi (=p1, p2, p3, p4, and p5) of the frequency of the absolute values of the steering angle prediction errors θe included in the respective prediction error segments bi (=b1 to b5) with respect to the total frequency.

In this way, the driving assistance unit 100A (the first traveling state distribution calculation unit 130D) classifies the absolute values of the distribution data (the steering angle prediction error θe) into the plural segmented data ranges (bins (respective prediction error segments bi)) and calculates the frequency distribution (the probabilities pi (=p1 to p5) of the respective prediction error segments bi) of the distribution data (the steering angle prediction error θe). Then, the driving assistance unit 100A (the first traveling state distribution calculation unit 130D) uses the calculated frequency distribution as the first traveling state distribution.

Next, in step S108, the driving assistance unit 100A (the second traveling state distribution calculation unit 130E) calculates the frequency distribution of the absolute values of the distribution data (the steering angle prediction error θe) as the second traveling state distribution, based on the steering angle prediction errors θe that are converted into their absolute values and accumulated in the temporarily data accumulating unit 130C. Specifically, the driving assistance unit 100A (the second traveling state distribution calculation unit 130E) classifies the absolute values of the steering angle prediction errors θe from 90 seconds ago to the present out of the absolute values of the steering angle prediction errors θe accumulated in the temporarily data accumulating unit 130C into the five respective prediction error segments bi (=b1 to b5). Next, the driving assistance unit 100A (the second traveling state distribution calculation unit 130E) calculates probabilities qi (=q1, q2, q3, q4, and q5) of the frequency of the absolute values of the steering angle prediction errors θe included in the respective prediction error segments bi (=b1 to b5) with respect to the total frequency.

In this way, the driving assistance unit 100A (the second traveling state distribution calculation unit 130E) classifies the absolute values of the distribution data (the steering angle prediction error θe) into the plural segmented data ranges (the bins (the respective prediction error segments bi)) and calculates the frequency distribution (the probabilities qi (=q1 to q5) of the respective prediction error segments bi) of the distribution data (the steering angle prediction error θe). Then, the driving assistance unit 100A (the second traveling state distribution calculation unit 130E) uses the calculated frequency distribution as the second traveling state distribution.

Next, in step S109, the driving assistance unit 100A (the distribution selecting unit 130G) determines which of the first disturbance driving situation, the second disturbance driving situation, and the ordinary driving situation the driving situation of the vehicle falls under, based on the determination result in step S103. Then, when the driving assistance unit 100A (the distribution selecting unit 130G) determines the driving situation of the vehicle falls under the first disturbance driving situation, the process proceeds to step S111. On the other hand, when the driving assistance unit 100A (the distribution selecting unit 130G) determines the driving situation of the vehicle falls under the second disturbance driving situation, the process proceeds to step S112. On the other hand, when the driving assistance unit 100A (the distribution selecting unit 130G) determines the driving situation of the vehicle falls under the ordinary disturbance driving situation, the process proceeds to step S110.

In step S110, the driving assistance unit 110A (the distribution selecting unit 130G) does not perform the reset processing and the restore processing. The process proceeds to step S113 without performing replacement of the first traveling state distribution and the second traveling state distribution.

On the other hand, in step S111, the driving assistance unit 100A (the distribution selecting unit 130G) performs the reset processing, and the process proceeds to step S113. In the reset processing, the driving assistance unit 100A (the distribution selecting unit 130G) replaces the second traveling state distribution calculated is step S108 with the first traveling state distribution calculated in step S107.

On the other hand, is step S112, the driving assistance unit 100A (the distribution selecting unit 130G) performs the restore processing, and the process proceeds to step S113. In the restore processing, the second traveling state distribution calculated is step S108 is replaced with the second traveling state distribution that does not include the absolute values of the distribution data (the steering angle prediction error θe) during a period in which it is determined that the driving situation of the vehicle is any of the first disturbance driving situation and the second disturbance driving situation.

Next, in step S113, the driving assistance unit 100A (the driving instability degree determination unit 140) calculates the absolute entropies Hp1 and Hp2 based on the first traveling state distribution and the second traveling state distribution (the replaced second traveling state distribution in the case in which the second traveling state distribution has been replaced) calculated in steps S107 and S108. Specifically, the traveling state distribution calculation unit 130 (the driving instability degree determination unit 140) calculates the absolute entropy Hp1 in accordance with following Expression 7 based on the first traveling state distribution calculated in step S107. Furthermore, the traveling state distribution calculation unit 130 (the driving instability degree determination unit 140) calculates the absolute entropy Hp2 in accordance with following Expression 8 based on the second traveling state distribution calculated in step S108.

$$H_{p1} = -\Sigma p_i \cdot \log_5 p_i \quad \text{(Expression 7)}$$

$$H_{p2} = -\Sigma q_i \cdot \log_5 q_i \quad \text{(Expression 8)}$$

From above descried Expressions 7 and 8, as the absolute entropies Hp1 and Hp2 is smaller, a degree of sharpness of the first traveling state distribution and the second traveling state distribution (i.e. the distributions of the steering angle prediction error θe) increases, and then a distribution of the absolute value of the steering angle prediction error θe falls within a certain range. That is, this means that the driving operation is performed smoothly, and the driving is in a stable state. On the other hand, as the absolute entropies Hp1 and Hp2 is larger, the degree of sharpness of the distributions of the absolute value of the steering angle prediction error θe) decreases, and then a distribution of the absolute value of the steering angle prediction error θe is dispersed. That is, this means that the driving operation is not performed smoothly, and the driving is in an unstable state.

Next, in step S114, the driving assistance unit 100A (the driving instability degree determination unit 140) calculates the magnitude (the relative entropy RHp) of the difference between the first traveling state distribution and the second traveling state distribution (the replaced second traveling state distribution in the case in which the second traveling state distribution has been replaced) calculated in steps S107 and S108 by using the R$^3$-steering entropy method. Specifically, the driving assistance unit 100A (the driving instability degree determination unit 140) calculates the relative entropy RHp in accordance with following Expression 9 based on the probabilities pi calculated in step S107, and the probabilities qi calculated in step S108.

$$RHp = \sum q_i \cdot \log_5 \frac{q_i}{p_i} \quad \text{(Expression 9)}$$

FIG. 12 is a view illustrating the relative entropy RHp.

From above described Expression 9, as the relative entropy RHp is smaller, the differences between the probabilities pi (=p1 to p5) of the first traveling state distribution and the probabilities qi (=q1 to q5) of the second traveling state distribution become smaller. That is, as illustrated in FIG. 12, this means that the current driving operation of the driver is performed smoothly similarly to the ordinary driving operation, and the driving is in a stable state. On the other hand, as the relative entropy RHp is larger, the differences between the probabilities pi (=p1 to p5) of the first traveling state distribution and the probabilities qi (=q1 to q5) of the second traveling state distribution become larger. That is, this means that the current driving operation of the driver is not performed smoothly compared to the ordinary driving operation, and the driving is in an unstable state.

Next, in step S115, the driving assistance unit 100A (the driving instability degree determination unit 140) estimates the driving state of the driver (i.e. determines whether or not the driving is in an unstable state) based on the absolute entropies Hp1 and Hp2 calculated in step S113. Specifically, the driving assistance unit 100A (the driving instability degree determination unit 140) determines whether or not the difference (Hp2−Hp1) between the absolute entropies Hp1 and Hp2 calculated in step S113 is larger than a predetermined determination threshold value. Then, when it is determined that the difference (Hp2−Hp1) between the absolute entropies Hp1 and Hp2 is larger than the determination threshold value, the driving assistance unit 100A (the driving instability degree determination unit 140) determines that the driving is in the unstable state. On the other hand, when it is determined that the difference (Hp2−Hp1) between the absolute entropies Hp1 and Hp2 is equal to or smaller than the determination threshold value, the driving assistance unit 100A (the driving instability degree determination unit 140) determines that the driving is in the stable state.

Next, in step S116, the driving assistance unit 100A (the driving instability degree determination unit 140) estimates the driving state of the driver (i.e. determines whether or not the driving is in the unstable state) based on the relative entropy RHp calculated in step S114. Specifically, the driving assistance unit 100A (the driving instability degree determination unit 140) determines whether or not the relative entropy RHp calculated in step S114 is larger than a predetermined determination threshold value. Then, when it is determined that the relative entropy RHp is larger than the determination threshold value, the driving assistance unit 100A (the driving instability degree determination unit 140) determines that the driving is in the unstable state. On the other hand, when it is determined that the relative entropy RHp is equal to or smaller than the determination threshold value, the driving assistance unit 100A (the driving instability degree determination unit 140) determines that the driving is in the stable state.

Next, in step S117, the driving assistance unit 100A (the information presentation unit 150) performs the processing (the information presentation processing) of presenting the presentation information to the driver based on the driving state estimated (determined) in steps S115 and S116. Specifically, the driving assistance unit 100A (the information presentation unit 150) determines whether or not the state determined to be the unstable state in both of steps S115 and S116 continues for a predetermined set time (for example, 5 seconds) or more. Then, when it is determined that the state determined to be the unstable state in both of steps S115 and S116 continues for the set time (for example, 5 seconds) or more, the driving assistance unit 100A (the information presentation unit 150) performs the information presentation processing. On the other hand, when it is determined that the state determined to be the unstable state in both of steps S115 and S116 does not continue for the set time (for example, 5 seconds) or more, the driving assistance unit 100A (the information presentation unit 150) does not perform the information presentation processing.

Figure 13:
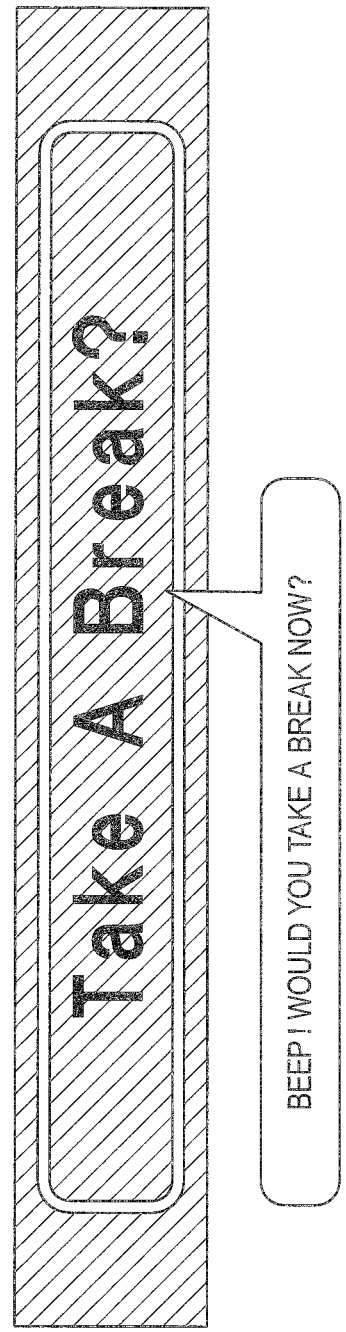
FIG. 13 is a view illustrating an example of an information presentation when it is in ON state.

FIG. 13 illustrates an example of the information presentation processing. In this example, an alarm is displayed as well as a sound alarm is presented such as "Beep! Would you take a break now?", or the like.

Figure 14:
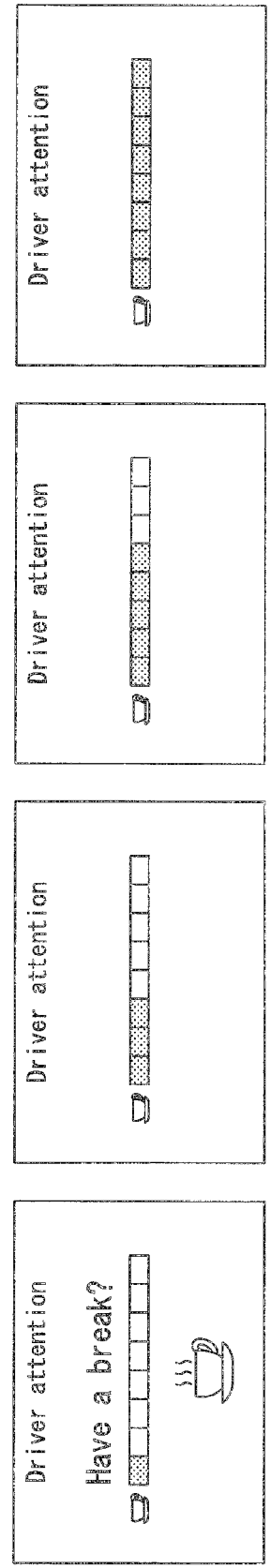
FIG. 14 is a view illustrating an example of an information presentation when it is in ON state.

It is to be noted that, in the present embodiment, the example in which the processing (the information presentation processing) of presenting the presentation information is performed when the state determined to be the unstable state continues for the set time (for example, 5 seconds) or more is described, however, another configuration can be adapted. As illustrated in FIG. 14, for example, a configuration configured to present a presentation level with plural steps by using a level gauge, as well as to present audio information corresponding to the representation level may be adapted.

In this case, as the driving instability degree that is the driving state is higher, the presentation level of the level gauge is set higher. In FIG. 14, the presentation level has eight steps, the display on the left side indicates a state in which the presentation level is higher (a state in which the driving instability degree is higher) than that on the right side.

(Operation or the Like)

Next, the operation of the vehicle on which the driving state estimation device according to the present embodiment is mounted.

It is assumed that the driving assistance unit 100A starts the driving instability degree determination processing while the vehicle is traveling. Then, the driving assistance unit 100A (the traveling state data acquisition unit 110, the driving situation determination unit 120) acquires the traveling state data (the steering angle information), the vehicle information, and the traffic environment information (steps S101, S102 in FIG. 6). Next, the driving assistance unit 100A (the driving situation determination unit 120) determines the driving situation of the vehicle (the first disturbance driving situation, the second disturbance driving situation, the ordinary driving situation) based on the acquired vehicle information and the acquired traffic environment information (step S103 in FIG. 6). Next, the traveling state distribution calculation unit 130 (the distribution data calculation unit 130A) calculates the distribution data (the steering angle prediction error θe) based on the acquired traveling state data (the steering angle information) (step S104).

Next, the driving assistance unit 100A (the absolute value conversion unit 130B) converts values of the calculated distribution data (the steering angle prediction error θe) into their absolute values (step S105 in FIG. 6). Next, the driving assistance unit 100A (the temporarily data accumulating unit 130C) accumulates the distribution data (the steering angle prediction error θe) whose values are converted into their absolute values, in the temporarily data accumulating unit 130C (step S105 in FIG. 6). Next, the driving assistance unit 100A (the temporarily data accumulating unit 130C, the first traveling state distribution calculation unit 130D, the second traveling state distribution calculation unit 130E) determines that the set time (for example, 5 seconds) does not elapse from the start of the driving instability degree determination processing ("No" in step S106 in FIG. 6). Then, the driving assistance unit 100A repeats the flow of steps S101 to S106, and calculates and accumulates the distribution data (the steering angle prediction error θe) by every the first period (for example, 50 msec).

In addition, it is assumed that the calculation and the accumulation of the distribution data (the steering angle prediction error θe) is performed one hundred times while the flow of above mentioned steps S101 to S106 is repeated, and 5 seconds elapse the start of the driving instability degree determination processing. Thus, the driving assistance unit 100A (the temporarily data accumulating unit 130C, the first traveling state distribution calculation unit 130D, the second traveling state distribution calculation unit 130E) determines that the set time (for example, 5 seconds) elapses from the start of the driving instability degree determination processing ("Yes" in step S106 in FIG. 6). Next, the driving assistance unit 100A (the first traveling state distribution calculation unit 130D) calculates the frequency distributions of the absolute values of the distribution data (the steering angle prediction error θe) as the first traveling state distribution and the second traveling state distribution, based on the distribution data (the steering angle prediction error θe) accumulated in the temporarily data accumulating unit 130C, whose values are converted into the absolute values (steps S107 and S108 in FIG. 6).

Here, it is assumed that the driving situation of the vehicle is the ordinary driving situation. Thus the driving assistance unit 100A (the distribution selecting unit 130G) determined that the driving situation of the vehicle is the ordinary driving situation based on the determination result in step S103 (steps S109 and S110 in FIG. 6). Next, the driving assistance unit 100A (the driving instability degree determination unit 140) calculates the absolute entropies Hp1 and Hp2 based on the calculated first traveling state distribution and the calculated second traveling state distribution (step S113 in FIG. 6). In the calculation of the absolute entropies Hp1 and Hp2, as seen in Expression 7 and Expression 8, a log calculation involving a relative high computation load is performed by the number of the bins (the prediction error segments bi) of the first traveling state distribution and the second traveling state distribution. Next, the driving assistance unit 100A (the driving instability degree determination unit 140) calculates the magnitude (the relative entropy RHp) of the difference between the first traveling state distribution and the second traveling state distribution by using the $R^3$-steering entropy method (step S114 in FIG. 6).

In the calculation of the relative entropy RHp, as seen in Expression 9, the log calculation involving a relative high computation load is performed by the number of the bins (the prediction error segments bi) of the first traveling state distribution and the second traveling state distribution. Next, the driving assistance unit 100A (the driving instability degree determination unit 140) estimates the driving state of the driver (i.e. determines whether or not the driving state of the driver is in an unstable state) based on the calculated absolute entropies Hp1 and Hp2 (step S115 in FIG. 6). Next, the driving assistance unit 100A (the driving instability degree determination unit 140) estimates the driving state of the driver (i.e. determines whether or not the driving state of the driver is in an unstable state) based on the calculated relative entropy RHp (step S116 in FIG. 6). Next, the driving assistance unit 100A (the information presentation unit 150) performs the presentation processing based on the estimated driving state (step S117 in FIG. 6). Thus, the driving assistance unit 100A calculates the first traveling state distribution, the second traveling state distribution, the absolute entropies Hp1 and Hp2, the relative entropy RHp by every the second period (for example 5 seconds)

As described above, in the present embodiment, the driving assistance unit 100A classifies the absolute values of the distribution data (the steering angle prediction error θe) into the plural segmented data ranges (bins (the prediction error segments bi)) and calculates the frequency distributions of the distribution data (the steering angle prediction error θe) as the first traveling state distribution and the second traveling state distribution. Therefore, in the present embodiment, the bins of the calculated first traveling state distribution and the calculated second traveling state distribution are set in only a positive value range. Thus, in the present embodiment, the number of the bins (the prediction error segments bi) of first traveling state distribution and the second traveling state distribution can be reduced. In this way, in the present embodiment, the computing load of the driving state estimation device can be reduced. Therefore, it is possible to obtain the driving state estimation device using a device with a relatively low computing power, such as a smartphone, a cheap in-vehicle controller, or the like. In addition, in the present embodiment, a storage capacity of the distribution accumulating unit 130F can be reduced by reducing the number of the bins (the prediction error segments bi) of the second traveling state distribution.

In addition, in the present embodiment, the driving assistance unit 100A acquires the distribution data (the steering angle prediction error θe) for the first traveling state distribution and the second traveling state distribution by every the predetermined first period (for example, 50 msec). Then, in the present embodiment, the first traveling state distribution and the second traveling state distribution are calculated based on the acquired distribution data (the steering angle prediction error θe) by every the second period (for example, 5 seconds) longer than the first period (for example, 50 msec). Therefore, in the present embodiment, the execution frequency of the computing based on the calculation (computing with 64-bit real numbers) of the first traveling state distribution and the second traveling state distribution and the calculation (log calculation) of the absolute entropies Hp1 and Hp2, the relative entropy RHp, that is the execution frequency of the computing with a relatively high computing load can be reduced. Therefore, in the present embodiment, the computing load of the driving state estimation device can be further reduced.

Figure 15:
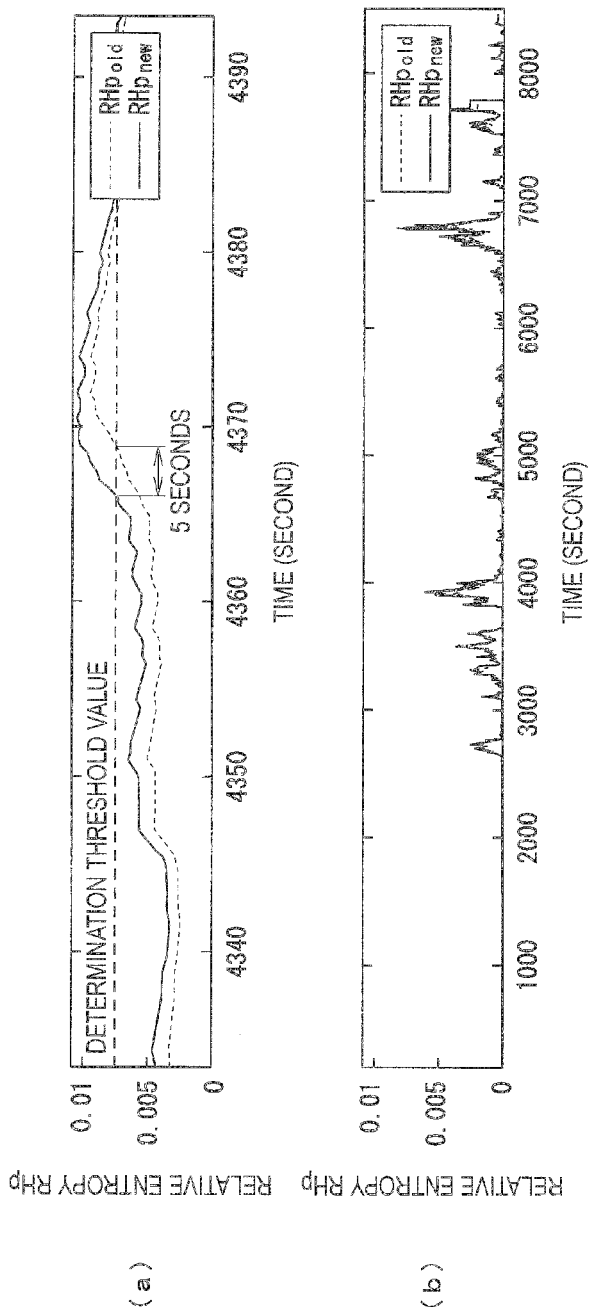
FIG. 15 is a view illustrating an operation of the vehicle on which the driving state estimation device is mounted.

FIG. 15 is a view illustrating the operation of the vehicle on which the driving state estimation device of the present embodiment is mounted. In FIG. 15, RHpnew is the relative entropy in the present embodiment in a case in which the frequency distribution of the absolute values of the distribution data (the steering angle prediction error θe) is used as the first traveling state distribution. In addition, RHpold is the relative entropy (hereinafter, also referred to as "relative entropy before improvement") in a case in which a frequency distribution of the distribution data (the steering angle prediction error θe) whose values are not converted into their absolute value is used as the first traveling state distribution.

As illustrated in FIG. 15A, the relative entropy RHpnew in the present embodiment exceeds the determination threshold five seconds behind the relative entropy RHpold before the improvement. However, a delay about 5 seconds is considered not to be a problem in the estimation of the driving state of the vehicle. In addition, as illustrated in FIG. 15B, the relative entropy RHpnew almost overlaps with the relative entropy RHpold before the improvement while the vehicle is traveling, thus, it is considered that there is no problem in practical use.

In the present embodiment, the traveling state data acquisition unit 110 in FIG. 3 and step S101 in FIG. 6 correspond to the traveling state data acquisition unit. Likewise, the traveling state distribution calculation unit 130 in FIG. 3, the distribution data calculation unit 130A in FIG. 5 and step S104 in FIG. 6 correspond to the distribution data acquisition unit. In addition, the traveling state distribution calculation unit 130 in FIG. 3, the first traveling state distribution calculation unit 130D and the second traveling state distribution calculation unit 130E in FIG. 5, and steps S107 and S108 correspond to the traveling state distribution calculation unit. Furthermore, the driving instability degree determination unit 140 in FIG. 3 and steps S114 and S116 correspond to the driving state estimation unit.

Advantageous Effects of Present Embodiment

The present embodiment has following advantageous effects.

(1) The driving assistance unit 100A is configured to acquire the distribution data (the steering angle prediction error θe) for the traveling state distributions (the first traveling state distribution, the second traveling state distribution) based on the traveling state data (the steering angle information). Next, the driving assistance unit 100A configured to convert values of the acquired distribution data (the steering angle prediction error θe) into their absolute values. Next, the driving assistance unit 100A configured to classify the absolute values of the distribution data (the steering angle prediction error θe) in different time ranges into bins (the prediction error segments bi) as the plural segmented data ranges and to calculate the plural frequency distributions of the distribution data (the steering angle prediction error θe) as the plural traveling state distributions (the first traveling state distribution, the second traveling state distribution), based on the distribution data (the steering angle prediction error θe) whose values are converted into the absolute values. Next, the driving assistance unit 100A is configured to estimate the driving state of the driver (i.e. determine driving instability degree) based on the calculated traveling state distributions (the first traveling state distribution, the second traveling state distribution). Through such a configuration, the absolute values of the distribution data (the steering angle prediction error θe) are classified into bins (the five prediction error segments bi) as the plural segmented data ranges, and the frequency distributions of the distribution data (the steering angle prediction error θe) are calculated as the traveling state distributions (the first traveling state distribution, the second traveling state distribution). Thus, the bins (the prediction error segments bi) of the calculated traveling state distributions (the first traveling state distribution, the second traveling state distribution) are set in only a positive value range. Therefore, the number of the bins (the prediction error segments bi) of the traveling state distributions (the first traveling state distribution, the second traveling state distribution) can be reduced. As a result, the computing load of estimation of the driving state based on the traveling state distributions (the first traveling state distribution, the second traveling state distribution) can be reduced. In this way, the computing load of the driving state estimation device can be reduced.

(2) The driving assistance unit 100A includes the temporarily data accumulating unit 130C configured to accumulate the distribution data (the steering angle prediction error θe) whose values are converted into the absolute values. Then, the driving assistance unit 100A is configured to acquire the distribution data (the steering angle prediction error θe) by every the predetermined first period (for example, 50 msec). Next, the driving assistance unit 100A is configured to calculate the traveling state distributions (the first traveling state distribution, the second traveling state distribution) by every the second period (for example 5 seconds) longer than the first period (for example, 50 msec), based on the distribution data (the steering angle prediction error θe) for the second period (for example 5 seconds) accumulated in the temporarily data accumulating unit 130C, whose values are converted into the absolute values. Through such a configuration, the distribution data (the steering angle prediction error θe) is acquired by every the predetermined first period (for example, 50 msec), and the plural traveling state distributions (the first traveling state distribution, the second traveling state distribution) are calculated by every the second period (for example 5 seconds) longer than the first period (for example, 50 msec). Therefore, the execution frequency of the computing based on the distribution data (the steering angle prediction error θe) such as the calculation of the plural traveling state distributions (the first traveling state distribution, the second traveling state distribution), the estimation of the driving state, and the like can be reduced. In this way, the computing load of the driving state estimation device can be reduced.

(3) The driving assistance unit 100A is configured to acquire the difference (the steering angle prediction error θe) between the estimated steering angle value under assumption that the steering wheel is smoothly operated and the actual steering angle, as the distribution data.

Such a configuration makes it possible to estimate the driving state regarding the steering operation by the driver.

Second Embodiment

Next, a second embodiment of the present invention will be described with reference to the accompanying drawings.

It is to be noted that components similar to these in the first embodiment described above are denoted by the same reference signs.

The present embodiment is different from the first embodiment in that the absolute values of the distribution data (the steering angle prediction error θe) are classified into the five segments (the prediction error segments bi), and the absolute values of the classified distribution data (the steering angle prediction error θe) are accumulated as a frequency for each segment (the prediction error segment bi). Specifically, processing in steps S105, S107, and S108 in FIG. 5 are changed from those in the first embodiment.

In step S105, the driving assistance unit 100A (the temporarily data accumulating unit 130C) accumulates the absolute value of the steering angle prediction error θe calculated in step S104 in the temporarily data accumulating unit 130C. Specifically, the driving assistance unit 100A (the temporarily data accumulating unit 130C) classifies the absolute value of the steering angle prediction error θe calculated in step S104 into the five prediction error segments bi (=b1 to b5). Next, the driving assistance unit 100A (the temporarily data accumulating unit 130C) sets segment sample numbers Ni (=N1, N2, N3, N4, N5) based on the classification result.

Specifically, the driving assistance unit 100A (the temporarily data accumulating unit 130C) increments the segment sample number N1 by one each time the absolute value of the steering angle prediction error θe is classified into the prediction error segment b1. Likewise, the driving assistance unit 100A (the temporarily data accumulating unit 130C) increments the segment sample number Nj (j is any of 2 to 5) by one each time the absolute value of the steering angle prediction error θe is classified into the prediction error segment bj. Initial values of the segment sample numbers Ni are set to zero. Next, the driving assistance unit 100A (the temporarily data accumulating unit 130C) accumulates the segment sample numbers Ni (=N1 to N5) in the temporarily data accumulating unit 130C. In this way, the driving assistance unit 100A (the temporarily data accumulating unit 130C) classifies the absolute values of the steering angle prediction error θe calculated in step S104 into the five prediction error segments bi (=b1 to b5), and accumulates the absolute values of the classified steering angle prediction error θe are accumulated as the frequency for each prediction error segment bi (=b1 to b5). It is to be noted that the driving assistance unit 100A (the temporarily data accumulating unit 130C) discards all data accumulated in the temporarily data accumulating unit 130C and initializes the segment sample numbers Ni (=N1 to N5) accumulated in the temporarily data accumulating unit 130C at the start of the driving instability degree determination processing.

It is to be noted that, when it is determined in step S103 that the driving situation of the vehicle is any of the first disturbance driving situation and the second disturbance driving situation, the driving assistance unit 100A (the temporarily data accumulating unit 130C) stops the accumulation of the absolute values of the steering angle prediction error θe calculated in step S104 into the temporarily data accumulating unit 130C. That is, the driving assistance unit 100A (the temporarily data accumulating unit 130C) stops the classification of the absolute value of the steering angle prediction error θe and the calculation and the accumulation of the segment sample numbers Ni (=N1 to N5). In this way, the driving assistance unit 100A (the temporarily data accumulating unit 130C) accumulates only the absolute value of the distribution data (the steering angle prediction error θe) during a period in which it is not determined in step S103 that the driving situation of the vehicle is any of the first disturbance driving situation and the second disturbance driving situation (i.e. a period in which it is determined that the driving situation of the vehicle is the ordinary driving situation). In addition, when it is determined in step S103 that the driving situation of the vehicle changes from any of the first disturbance driving situation and the second disturbance driving situation to the ordinary driving situation, the driving assistance unit 100A (the temporarily data accumulating unit 130C) resumes the accumulation of the absolute values of the steering angle prediction error θe calculated in step S104 into the temporarily data accumulating unit 130C. That is, the driving assistance unit 100A (the temporarily data accumulating unit 130C) resumes the classification of the absolute value of the steering angle prediction error θe and the calculation and the accumulation of the segment sample numbers Ni (=N1 to N5).

In step S107, the driving assistance unit 100A (the first traveling state distribution calculation unit 130D) calculates the first traveling state distribution based on the absolute value (the segment sample numbers Ni (=N1 to N5)) of the steering angle prediction error θe accumulated in the temporarily data accumulating unit 130C. Specifically, the driving assistance unit 100A (the first traveling state distribution calculation unit 130D) calculates the probabilities pi (=p1 to p5) of the frequency of the absolute values of the steering angle prediction errors θe included in the respective prediction error segments bi (=b1 to b5) with respect to the total frequency in accordance with following Expression 10, based on the segment sample numbers Ni (=N1 to N5) accumulated in the temporarily data accumulating unit 130C.

$$p_i = \frac{p_{iold} + \frac{Ni}{K_{window}}}{1 + \frac{N_{all}}{K_{window}}} \quad \text{(Expression 10)}$$

In Expression 10, piold is pi calculated in the last driving instability degree determination processing previously performed, and Kwindow is a sample number (the number of the absolute values of the steering angle prediction errors θe) used in calculating the first traveling state distribution, and Nall is a sum of the segment sample numbers Ni (=N1 to N5). In the present embodiment, Kwindow in Expression 10 is 432000 (=2160 seconds/50 msec per one time)

In addition, when it is determined in step S103 that the driving situation is the ordinary driving situation, Nall is 100 (=5 seconds/50 msec per one time). It is to be noted that Nall, that is, the sum of the segment sample numbers N1 to N5 is smaller than 100, when it is determined in step S103 that the driving situation is any of the first disturbance driving situation and the second disturbance driving situation.

In step 108, the driving assistance unit 100A (the second traveling state distribution calculation unit 130E) calculates the second traveling state distribution based on the steering angle prediction error θe (the segment sample numbers Ni (=N1 to N5)) accumulated in the temporarily data accumulating unit 130C. Specifically, the driving assistance unit 100A (the second traveling state distribution calculation unit 130E) calculates the probabilities qi (=q1 to q5) of the frequency of the absolute values of the steering angle prediction errors θe included in the respective prediction error segments bi (=b1 to b5) with respect to the total frequency in accordance with following Expression 11, based on the segment sample numbers Ni (=N1 to N5)) accumulated in the temporarily data accumulating unit 130C. Then, the driving assistance unit 100A (the second traveling state distribution calculation unit 130E) accumulates the calculated second traveling state distribution in the distribution accumulating unit 130F.

$$q_i = \frac{q_{iold} + \frac{Ni}{K_{window}}}{1 + \frac{N_{all}}{K_{window}}} \quad \text{(Expression 11)}$$

In Expression 11, qiold is qi calculated in the last driving instability degree determination processing previously performed, and Kwindow is a sample number (the number of the absolute values of the steering angle prediction errors θe) used in calculating the second traveling state distribution, and Nall is a sum of the segment sample numbers Ni (=N1 to N5). In the present embodiment, Kwindow in Expression 11 is 18000 (=90 seconds/50 msec per one time)

In addition, when it is determined in step S103 that the driving situation is the ordinary driving situation, Nall is 100 (=5 seconds/50 msec per one time). It is to be noted that Nall, that is, the sum of the segment sample numbers N1 to N5 is smaller than 100, when it is determined in step S103 that the driving situation is any of the first disturbance driving situation and the second disturbance driving situation.

Advantageous Effect of Present Embodiment

The present embodiment has a following advantageous effect.

(1) The driving assistance unit 100A is configured to classify the distribution data (the steering angle prediction error θe) into the five prediction error segments bi (=b1 to b5), and accumulate the classified distribution data (the steering angle prediction error θe) in the temporarily data accumulating unit 130C as a frequency for each prediction error segment bi (=b1 to b5).

Through such a configuration, the frequency of the distribution data (the steering angle prediction error θe) for each of the five prediction error segments bi (=b1 to b5) is accumulated in the temporarily data accumulating unit 130C. Therefore, it is possible to calculate the traveling state distributions (the first traveling state distribution, the second traveling state distribution) based on the frequency of the distribution data (the steering angle prediction error θe) for each of the five prediction error segments bi (=b1 to b5).

Third Embodiment

Next, a third embodiment of the present invention will be described with reference to the accompanying drawings.

It is to be noted that components similar to these in the first embodiment described above are denoted by the same reference signs.

The present embodiment is different from the first embodiment in that a yaw rate is used as the distribution data.

Figure 16:
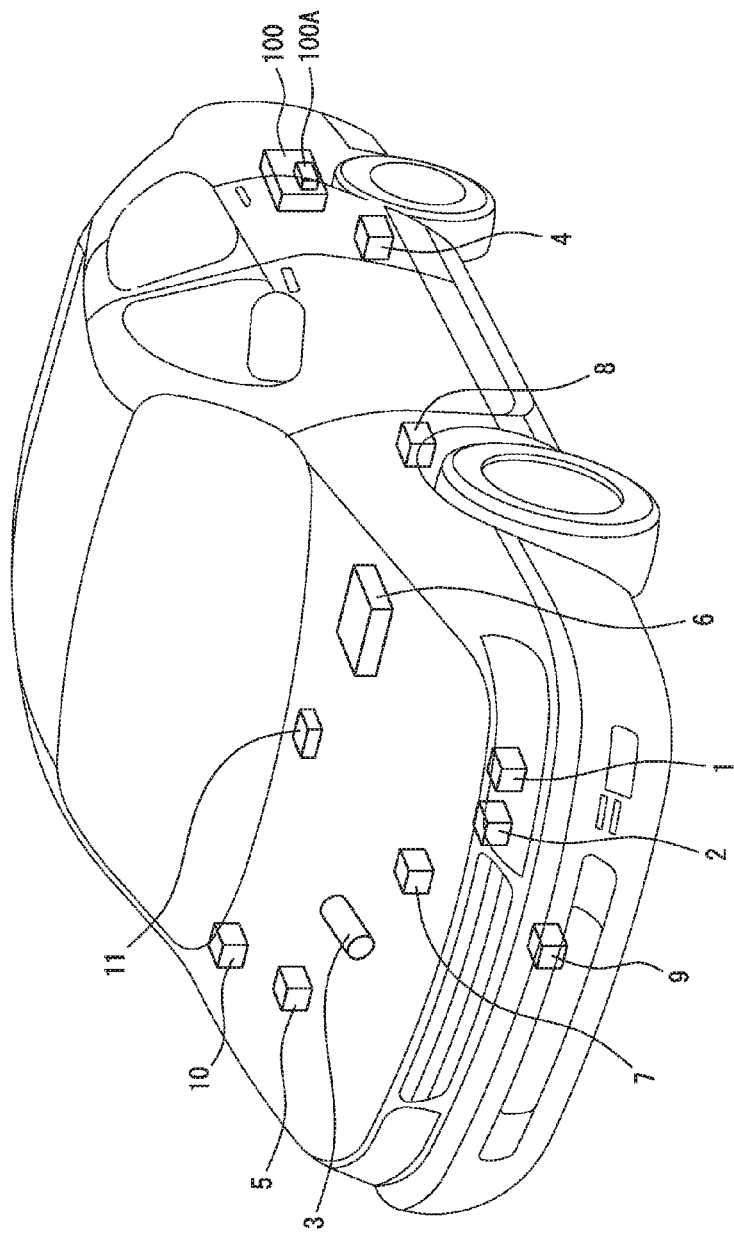
FIG. 16 is a view illustrating a configuration of the vehicle on which the driving state estimation device is mounted.

FIG. 16 is a view illustrating a configuration of the vehicle on which the driving state estimation device of the present embodiment is mounted.

Specifically, as illustrated in FIG. 16, the vehicle includes a yaw rate sensor 11.

The yaw rate sensor 11 is configured to detect a yaw rate of the vehicle. Next, the yaw rate sensor 11 is configured to output the detected yaw rate to the controller 100.

Then, the driving assistance unit 100A is configured to calculate the absolute entropies Hp1 and Hp2, and the relative entropy RHp by using the raw rate detected by the yaw rate sensor 11 instead of the steering angle prediction error θe (steps S105 to S114 in FIG. 6).

Advantageous Effect of Present Embodiment

The driving assistance unit 100A is configured to acquire the yaw rate of the vehicle as the distribution data.

Such a configuration makes it possible to estimate the driving state regarding the driving by the driver in a transverse direction.

Fourth Embodiment

Next, a fourth embodiment of the present invention will be described with reference to the accompanying drawings.

It is to be noted that components similar to these in the first embodiment described above are denoted by the same reference signs.

The present embodiment is different from the first embodiment in that a transverse position of the vehicle in a traffic lane is used as the distribution data.

Figure 17:
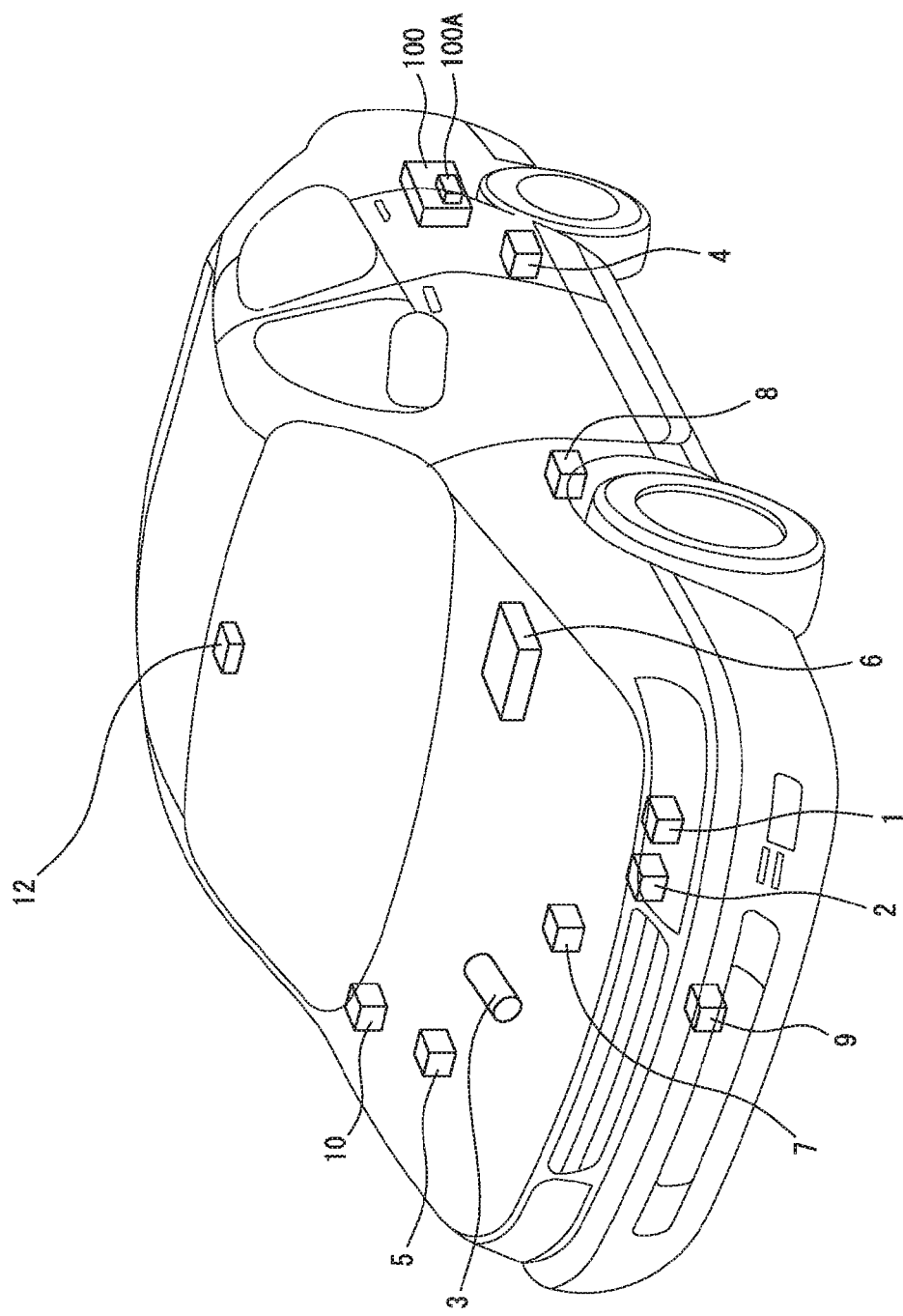
FIG. 17 is a view illustrating a configuration of the vehicle on which the driving state estimation device is mounted.

FIG. 17 is a view illustrating a configuration of the vehicle on which the driving state estimation device of the present embodiment is mounted. Specifically, as illustrated in FIG. 17, the vehicle includes a front view camera 12.

The front view camera 12 is configured to capture an image of the road ahead the vehicle. Next, the front view camera 12 is configured to output the captured image to the controller 100.

Then, the driving assistance unit 100A is configured to calculate the transverse position of the vehicle in the traffic lane from the image captured by the front view camera 12 instead of the steering angle prediction error θe, and to calculate the absolute entropies Hp1 and Hp2, and the relative entropy RHp by using the calculated transverse position in the traffic lane.

Advantageous Effect of Present Embodiment

The driving assistance unit 100A is configured to acquire the transverse position of the vehicle in the traffic lane as the distribution data.

Such a configuration makes it possible to estimate the driving state regarding the driving by the driver in the transverse direction.

Fifth Embodiment

Next, a fifth embodiment of the present invention will be described with reference to the accompanying drawings.

It is to be noted that components similar to these in the first embodiment described above are denoted by the same reference signs.

Figure 18:
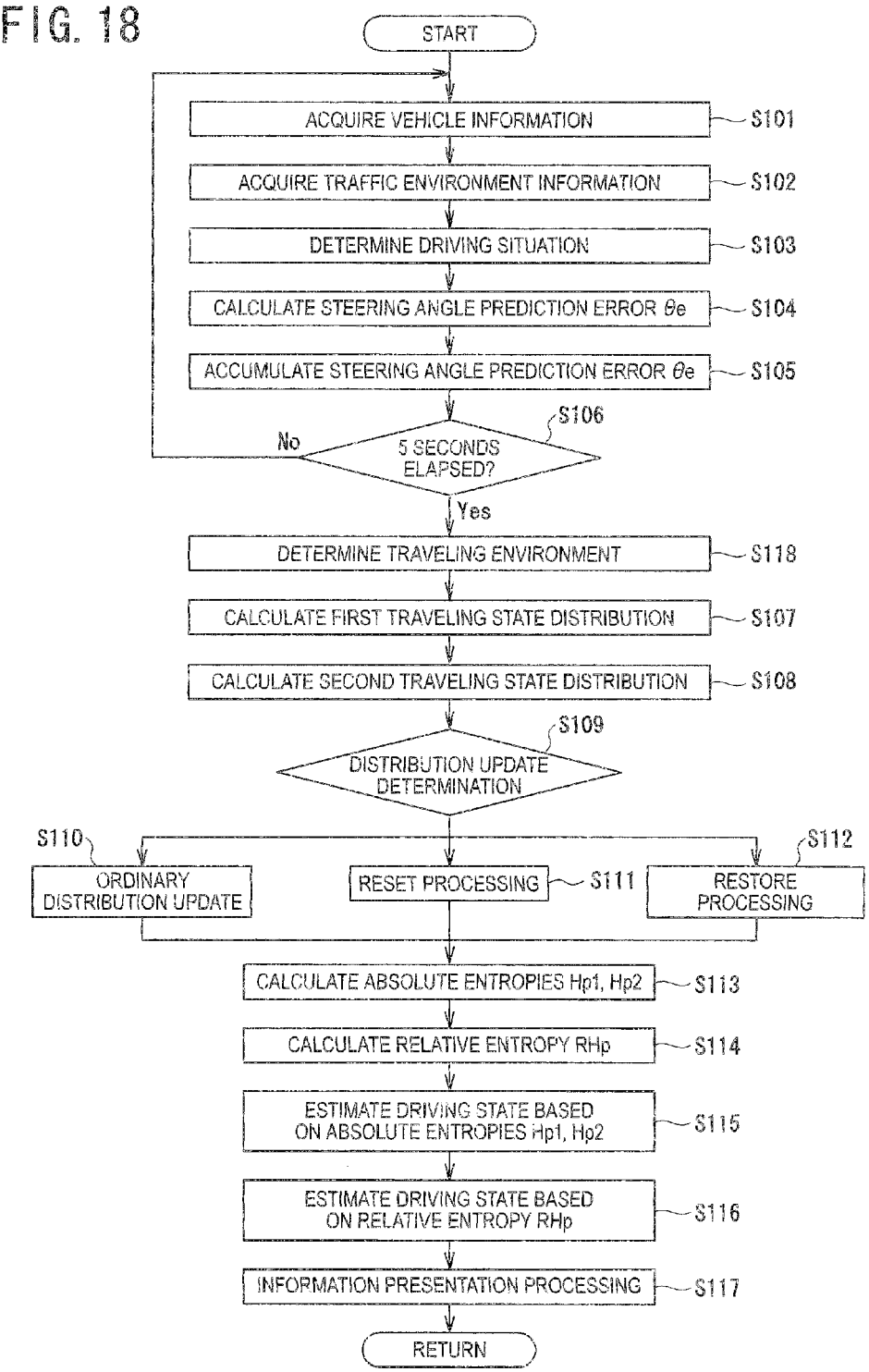
FIG. 18 is a flowchart illustrating a driving instability degree determination processing.

FIG. 18 is a flowchart illustrating the driving instability degree determination processing.

The present embodiment is different from the first embodiment in that the distribution data whose values are converted into their absolute values is not used when it is determined that the traveling environment of the vehicle is a predetermined set traveling environment, and the traveling state distributions (the first traveling state distribution, the second traveling state distribution) are calculated from distribution data whose values are not converted into absolute values. The set traveling environment is, for example, a traveling road (a circuit or the like) in which a ratio of left-hand curves to right-hand curves is out of a predetermined set range. As the ratio of the left-hand curves to the right-hand curves, for example, a ratio (a leftward steering time/a rightward steering time) of the leftward steering time in which the steering wheel is steered leftward from a neutral position to the rightward steering time in which the steering wheel is steered rightward from the neutral position can be adapted. Specifically, as illustrated in FIG. 18, the present embodiment is different from the first embodiment in that the processing in steps S101, S105, S107, and S108 are changed and in that there is a step S118 between step S106 and step S107.

In step S101, the driving assistance unit 100A (the traveling state data acquisition unit 110, the driving situation determination unit 120) acquires the vehicle information. Next, the driving assistance unit 100A (the traveling state data acquisition unit 110, the driving situation determination unit 120) accumulates the acquired vehicle information (the traveling state data (the steering angle information)) in a memory of the controller 100.

In step S105, the driving assistance unit 100A (the absolute value conversion unit 130B) converts the steering angle prediction error θe (the distribution data) calculated in step S104 into its absolute value. Next, the driving assistance unit 100A (the absolute value conversion unit 130B) accumulates the distribution data (the steering angle prediction error θe) whose value is converted into its absolute value and the distribution data calculated in step S104 (i.e. the distribution data (the steering angle prediction error θe) whose value is not converted into its absolute value) in the temporarily data accumulating unit 130C.

It is to be noted that, in the present embodiment, there is described an example in which the value of the distribution data (the steering angle prediction error θe) is converted into its absolute value, and the both of the distribution data (the steering angle prediction error θe) whose value is converted into its absolute value and the distribution data (the steering angle prediction error θe) whose value is not converted into its absolute value are accumulated. However, another configuration can be adapted. For example, when it is determined that the traveling environment of the vehicle is the predetermined set traveling environment, the conversion of the steering angle prediction error θe into its absolute value may be stopped and the only distribution data (the steering angle prediction error θe) whose value is not converted into its absolute value may be accumulated in the temporarily data accumulating unit 130C. In this case, when it is determined that the traveling environment of the vehicle is not the predetermined set traveling environment, the steering angle prediction error θe is converted into its absolute value and the only distribution data (the steering angle prediction error θe) whose value is converted into its absolute value may be accumulated in the temporarily data accumulating unit 130C.

In step S118, the driving assistance unit 100A determines whether or not the traveling environment of the vehicle is the set traveling environment (the traveling road in which the ratio of the left-hand curves to the right-hand curves is out of the predetermined set range) based on the traveling state data (the steering angle information) accumulated in the memory of the controller 100. Specifically, the driving assistance unit 100A is configured to determine whether or not the ratio of the leftward steering time to the rightward steering time is out of the predetermined set range based on the traveling state data (the steering angle information) for the set time T0 seconds (for example, 2160 seconds) from the set time T0 seconds ago to the present. Then, when it is determined that the ratio of the leftward steering time to the rightward steering time is out of the predetermined set range, the driving assistance unit 100A determines that the ratio of the left-hand curves to the right-hand curves is out of the predetermined set range and that the traveling environment of the vehicle is the set traveling environment. On the other hand, when it is determined that the ratio of the leftward steering time to the rightward steering time is within the predetermined set range, the driving assistance unit 100A determines that the ratio of the left-hand curves to the right-hand curves is within the predetermined set range and that the traveling environment of the vehicle is not the set traveling environment.

Figures 19, 20:
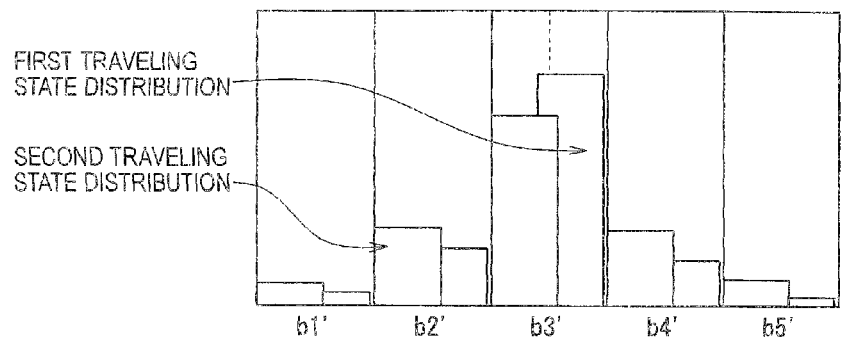
FIG. 19 is a view illustrating a range of the prediction error segment bi.
FIG. 20 is a view illustrating method for calculating the first traveling state distribution and the second traveling state distribution.

FIG. 19 is a view illustrating a range of the prediction error segment bi. In addition, FIG. 20 is a view illustrating method for calculating the first traveling state distribution and the second traveling state distribution.

In step S107, when it is determined in step S118 that the traveling environment is not the set traveling environment, the driving assistance unit 100A (the first traveling state distribution calculation unit 130D) calculates the frequency distribution of the absolute values of the distribution data (the steering angle prediction error θe) as the first traveling state distribution, based on the steering angle prediction errors θe converted into their absolute values and accumulated in the temporarily data accumulating unit 130C, similarly to the first embodiment. On the other hand, when it is determined in step S118 that the traveling environment is the set traveling environment, the driving assistance unit 100A (the first traveling state distribution calculation unit 130D) calculates the frequency distribution of the distribution data (the steering angle prediction error θe) as the first traveling state distribution, based on the distribution data (the steering angle prediction error θe) accumulated in the temporarily data accumulating unit 130C, whose values are not converted into their absolute values. Specifically, as illustrated in FIG. 19 and FIG. 20, the driving assistance unit 100A (the first traveling state distribution calculation unit 130D) classifies the steering angle prediction errors θe for the set time T0 seconds (for example, 2160 seconds) from the set time T0 seconds ago to the present out of the steering angle prediction errors θe accumulated in the temporarily data accumulating unit 130C into the plural segmented data ranges (bins). In the present embodiment, five prediction error segments bi' (=b1', b2', b3', b4', and b5') are adapted as the bins.

The ranges of the prediction error segments bi' (=b1' to b5') are set based on α value used for calculation of the steering entropy. Specifically, the prediction error segment b1' is smaller than −5α, the prediction error segment b2' is equal to or larger then −5α and smaller than −2α, and the prediction error segment b3' is equal to or larger then −2α and smaller than 2α. In addition, the prediction error segment b4' is equal to or larger then 2α and smaller than 5α, and the prediction error segment b5' is equal to or larger then 5α. The same ranges of the prediction error segments bi' (=b1' to b5') are used for the first traveling state distribution and the second traveling state distribution. In this way, the driving assistance unit 100A (the first traveling state distribution calculation unit 130D) is configured to increase the width of the bin (the prediction error segment bi') of the first traveling state distribution and the second traveling state distribution when it is determined that the traveling environment is the set traveling environment, in comparison to the case in which it is determined that the traveling environment is not the set traveling environment.

Next, the driving assistance unit 100A (the first traveling state distribution calculation unit 130D) calculates probabilities pi (=p1 to p5) of the frequency of the steering angle prediction errors θe included in the respective prediction error segments bi' (=b1' to b5') with respect to the total frequency. In this way, the driving assistance unit 100A (the first traveling state distribution calculation unit 130D) classifies the distribution data (the steering angle prediction error θe) into the plural segmented data ranges (bins (respective prediction error segments bi')) and calculates the frequency distribution (the probabilities pi (=p1 to p5) of the respective prediction error segments bi') of the distribution data (the steering angle prediction error θe). Then, the driving assistance unit 100A (the first traveling state distribution calculation unit 130D) uses the calculated frequency distribution as the first traveling state distribution.

In step S108, when it is determined in step S118 that the traveling environment is not the set traveling environment, the driving assistance unit 100A (the second traveling state distribution calculation unit 130E) calculates the frequency distribution of the absolute values of the distribution data (the steering angle prediction error θe) as the second traveling state distribution, based on the steering angle prediction errors θe converted into their absolute values and accumulated in the temporarily data accumulating unit 130C, similarly to the first embodiment. On the other hand, when it is determined in step S118 that the traveling environment is the set traveling environment, the driving assistance unit 100A (the second traveling state distribution calculation unit 130E) calculates the frequency distribution of the distribution data (the steering angle prediction error θe) as the second traveling state distribution, based on the distribution data (the steering angle prediction error θe) accumulated in the temporarily data accumulating unit 130C, whose values are not converted into their absolute values.

Specifically, the driving assistance unit 100A (the second traveling state distribution calculation unit 130E) classifies the steering angle prediction errors θe from 90 seconds ago to the present out of the steering angle prediction errors θe accumulated in the temporarily data accumulating unit 130C into the five respective prediction error segments bi' (=b1' to b5'). Next, the driving assistance unit 100A (the second traveling state distribution calculation unit 130E) calculates probabilities qi (=q1 to q5) of the frequency of the steering angle prediction errors θe included in the respective prediction error segments bi' (=b1' to b5') with respect to the total frequency. In this way, the driving assistance unit 100A (the second traveling state distribution calculation unit 130E) classifies the distribution data (the steering angle prediction error θe) into the plural segmented data ranges (bins (respective prediction error segments bi') and calculates the frequency distribution (the probabilities qi (=q1 to q5) of the respective prediction error segments bi') of the distribution data (the steering angle prediction error θe). Then, the driving assistance unit 100A (the second traveling state distribution calculation unit 130E) uses the calculated frequency distribution as the second traveling state distribution.

In the present modification, step S118 in FIG. 18 corresponds to the travel environment detection unit.

Advantageous Effects of Present Embodiment

The driving assistance unit 100A is configured to determine whether or not the traveling environment of the vehicle is the predetermined set traveling environment based on the traveling state data (the steering angle information). Next, the driving assistance unit 100A is configured to classify the frequency distribution of the distribution data in different time ranges out of the distribution data (the steering angle prediction error θe) whose values are not converted into their absolute values into bins which are the plural segmented data ranges (the five respective prediction error segments bi')) to calculate the distribution data (the steering angle prediction error θe) as the plural traveling state distributions (the first traveling state distribution, the second traveling state distribution) instead of using the distribution data (the steering angle prediction error θe) whose values are converted into their absolute values, when it is determined that the traveling environment of the vehicle is the set traveling environment. In addition, the driving assistance unit 100A is configured to increase the width of the bins (the respective prediction error segment bi') of the traveling state distribution (the first traveling state distribution, the second traveling state distribution).

Through such a configuration, when the traveling environment of the vehicle is the set traveling environment, the frequency distribution of the distribution data (the steering angle prediction error θe) is calculated as the traveling state distribution (the first traveling state distribution, the second traveling state distribution), from the distribution data (the steering angle prediction error θe) whose values are not converted into their absolute values. Therefore, for example, it is possible to estimate the driving state of the driver in more detail in comparison to the method in which the frequency distribution of the absolute values of distribution data (the steering angle prediction error θe) is calculated as the traveling state distributions (the first traveling state distribution, the second traveling state distribution), from the distribution data (the steering angle prediction error θe) whose values are converted into their absolute values.

(2) The driving assistance unit 100A is configured to determine whether or not the ratio of the left-hand curves to the right-hand curves in the traveling road of the vehicle is out of the predetermined set range based on the traveling state data (the steering angle information). Next, the driving assistance unit 100A is configured to determine that the traveling environment of the vehicle is the set traveling environment when it is determined that the ratio of the left-hand curves to the right-hand curves in the traveling road of the vehicle is out of the predetermined set range.

Such a configuration makes it possible to estimate the driving state of the driver in more detail when the vehicle travels on the traveling road in which any one of the number of the left-hand curves and the number of the right-hand curves are larger than the other, such as a circuit or the like.

While the present invention has been described with reference to the definite number of embodiments, the scope of the present invention is not limited thereto and improvements and modifications of the embodiments based on the above disclosure are obvious to those skilled in the art.

The invention claimed is:

1. A driving state estimation device comprising a controller configured to:
    acquire traveling state data including at least one of a vehicle state and an operation state of a driving operator operable by a driver;
    acquire distribution data for a traveling state distribution based on the acquired traveling state data;
    convert values of the acquired distribution data into their absolute values;
    determine, based on the acquired traveling state data, a traveling environment of the vehicle;
    in response to determining that the traveling environment of the vehicle is not a predetermined set traveling environment,
        classify the absolute values of the distribution data in different time ranges into first bins as a plurality of segmented data ranges based on the distribution data whose values are converted into their absolute values, and
        calculate frequency distributions of the absolute values of the distribution data as a plurality of traveling state distributions;
    in response to determining that the traveling environment of the vehicle is the predetermined set traveling environment,
        classify the distribution data in the different time ranges out of the acquired distribution data into second bins as the plurality of segmented data ranges, and
        calculate the distribution data as the plurality of traveling state distributions instead of using the distribution data whose values are converted into their absolute values; and
    estimate a driving state of the driver based on the calculated plurality of traveling state distributions.

2. The driving state estimation device according to claim 1, wherein the controller is further configured to:
    accumulate the distribution data therein, whose values are converted into their absolute values;
    acquire the distribution data every predetermined first period; and
    calculate the plurality of traveling state distributions every second period longer than the predetermined first period, based on the absolute values of the distribution data accumulated for the second period.

3. The driving state estimation device according to claim 1, wherein the second bins having widths greater than the first bins.

4. The driving state estimation device according to claim 1, wherein the controller is further configured to determine a ratio of left-hand curves to right-hand curves in a traveling road of the vehicle is out of a predetermined set range based on the acquired traveling state data, and to determine the traveling environment of the vehicle is the set traveling environment when it is determined that the ratio of the left-hand curves to the right-hand curves in the traveling road of the vehicle is out of the predetermined set range.

5. The driving state estimation device according to claim 1, wherein the controller is further configured to acquire a difference between an estimated steering angle value under assumption that a steering wheel is operated smoothly and an actual steering angle as the distribution data.

6. The driving state estimation device according to claim 1, wherein the controller is further configured to acquire a yaw rate of the vehicle as the distribution data.

7. The driving state estimation device according to claim 1, wherein the controller is further configured to acquire a transverse position of the vehicle in a traffic lane as the distribution data.

8. A driving state estimation method comprising:
  acquiring traveling state data including at least one of a vehicle state and an operation state of a driving operator operable by a driver;
  acquiring distribution data for a traveling state distribution based on the acquired traveling state data;
  determine, based on the acquired traveling state data, a traveling environment of the vehicle;
  in response to determining that the traveling environment of the vehicle is not a predetermined set traveling environment,
    converting values of the acquired distribution data into their absolute values;
    classifying the absolute values of the distribution data in different time ranges into bins as a plurality of segmented data ranges based on the distribution data whose values are converted into their absolute values, and
    calculating frequency distributions of the absolute values of the distribution data as a plurality of traveling state distributions;
  in response to determining that the traveling environment of the vehicle is the predetermined set traveling environment,
    classifying the distribution data in the different time ranges out of the acquired distribution data into second bins as the plurality of segmented data ranges, and
    calculating the frequency distributions of the distribution data as the plurality of traveling state distributions; and
  estimating a driving state of the driver based on the plurality of calculated traveling state distributions.

* * * * *